US010560748B2

(12) United States Patent
Cugi et al.

(10) Patent No.: US 10,560,748 B2
(45) Date of Patent: Feb. 11, 2020

(54) MANAGED CONTENT DISTRIBUTION SYSTEMS AND METHODS

(71) Applicant: Intertrust Technologies Corporation, Sunnyvale, CA (US)

(72) Inventors: Guido Cugi, London (GB); Jack Lacy, Warren, NJ (US); Yutaka Nagao, Cupertino, CA (US); Pierre Chavanne, Davis, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

(21) Appl. No.: 15/927,404

(22) Filed: Mar. 21, 2018

(65) Prior Publication Data

US 2018/0279002 A1 Sep. 27, 2018

Related U.S. Application Data

(60) Provisional application No. 62/638,021, filed on Mar. 2, 2018, provisional application No. 62/474,384, filed on Mar. 21, 2017.

(51) Int. Cl.
*H04N 21/4627* (2011.01)
*G06F 21/62* (2013.01)
(Continued)

(52) U.S. Cl.
CPC ....... *H04N 21/4627* (2013.01); *G06F 21/105* (2013.01); *G06F 21/62* (2013.01);
(Continued)

(58) Field of Classification Search
None
See application file for complete search history.

(56) References Cited

U.S. PATENT DOCUMENTS

2004/0017914 A1\* 1/2004 Tada ................ G06F 21/10
380/201
2006/0107285 A1 5/2006 Medvinsky
(Continued)

FOREIGN PATENT DOCUMENTS

WO WO 2007/028099 A2 3/2007

OTHER PUBLICATIONS

International Search Report and Written Opinion dated Jun. 20, 2018 for related International Application No. PCT/US2018/023615, filed Mar. 21, 2018 (17 pages).
(Continued)

*Primary Examiner* — James R Marandi
(74) *Attorney, Agent, or Firm* — Finnegan Henderson Farabow Garrett & Dunner LLP

(57) ABSTRACT

This disclosure relates to, among other things, systems and methods for managing the secure management and distribution of electronic content over broadcast and/or broadband communication channels. Certain embodiments disclosed herein may allow for implementation of a digital rights management service in connection with bidirectional communication channels and/or unidirectional communication channels, such as a broadcast signal. Various embodiments may allow for the generation and/or transmission of a digital rights management license in a field included in a broadcast signal. The license may be used by a client device to securely manage a received broadcast signal in accordance with associated rules and/or rights.

20 Claims, 18 Drawing Sheets

(51) Int. Cl.
*G06F 21/10* (2013.01)
*H04N 21/4623* (2011.01)
*H04N 21/4405* (2011.01)
*H04N 21/266* (2011.01)
*H04N 21/6334* (2011.01)

(52) U.S. Cl.
CPC ... *H04N 21/26613* (2013.01); *H04N 21/4405* (2013.01); *H04N 21/4623* (2013.01); *H04N 21/6334* (2013.01)

(56) References Cited

U.S. PATENT DOCUMENTS

| | | | |
|---|---|---|---|
| 2006/0253401 A1* | 11/2006 | Kim | G06F 21/10 |
| | | | 705/59 |
| 2007/0140488 A1 | 6/2007 | Dharmaji et al. | |
| 2010/0228971 A1 | 9/2010 | Carles et al. | |
| 2012/0257749 A1 | 10/2012 | Gremaud et al. | |
| 2017/0300668 A1* | 10/2017 | Bawa | G06F 21/105 |

OTHER PUBLICATIONS

"Specification Conditional Access", Development Project, Mobile.info, XP55031637A, Version 1.0.0, pp. 1-32 (May 22, 2006).

* cited by examiner

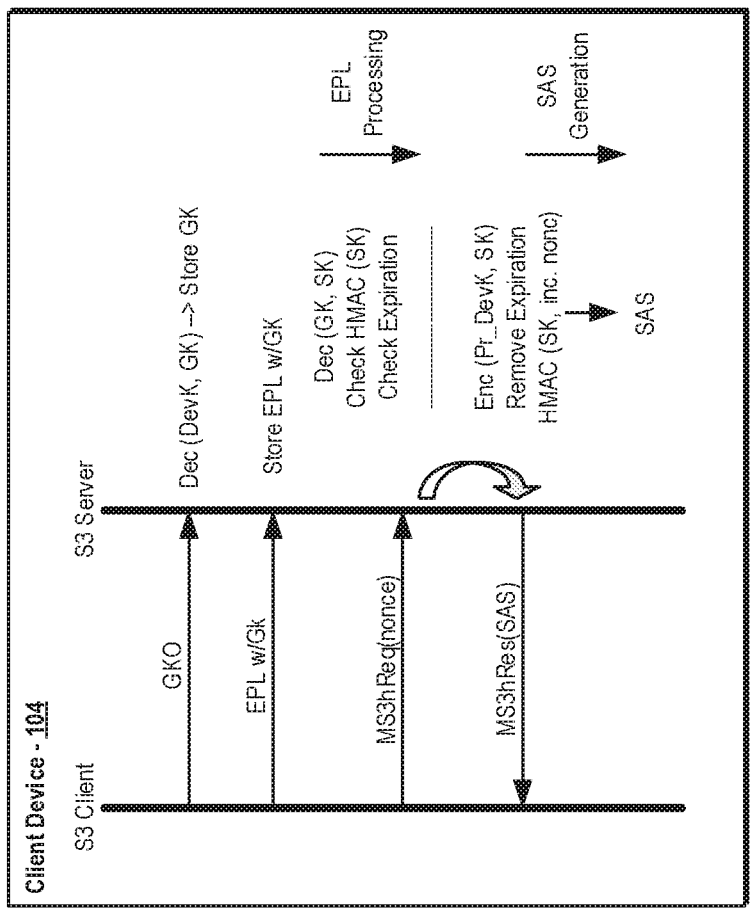
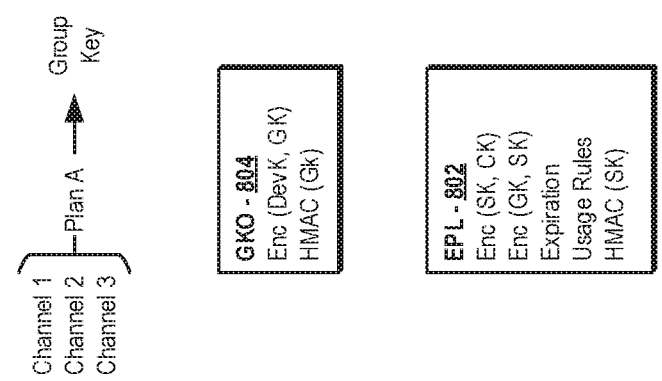
Figure 8

```
S3 EPL: {
    version: bit (8)

key: Key
    controlFlags: bit (8)

usageRule: {
        outputControl: {
            outputControlValue: bits (32)
            outputControlFlags: bits (32)
        }
    }
    expiration: bit (32)
    extensionCount: unsigned int (32)
    extensions: Extension [extensionCount]
}

Key: {
    contentId: bit (160)
    keyData: bit (128)
}

Extension: { size: unsigned int (32)
    type: bit(32)
    criticalFlag: bit (8)
    payload: bit (8) [size-9]
}
```

Figure 9

First compute WSK, DK, and WDK:

WSK = HMAC(Pr_Devk, empty) (32 bytes)

DK = trunc16(HMAC(WSK, "ExCA Master::<device node id>" + b[0])) (first 16 bytes, 0-15)

Where an example of "ExCA Master::<device node id>" is the string
- "ExCA Master::urn:marlin:organization:testpdc:device-maker-x:8pusperso:000433c5"

WDK = HMAC(DK, empty) (32 bytes)

Then derive sks<x> as follows:

{sks1,sks2} = HMAC(WDK, "ExCA KEK::<device node id>" + b[0])

{sks3,sks4} = HMAC(WDK, sks1+sks2+"ExCA KEK::<device node id>" + b[1])

Where:

b={0x0,0x1,....} (circular array up to 256 length)
"+" denotes concatenation

{sks1,sks2} denotes the 32 byte array of 2 arrays of 16 bytes each

As an example, using the following input values:
- Pr_Devk: 05942EC0A047F261EEE617A80C2EC325
- NodeId: urn:marlin:organization:testpdc:device-maker-x:8pusperso:000433c5

The following intermediate and final SKS1 values may be derived:
- WSK: 176C0FB9BC0E94F6008108145EE2E57A58D1E12C018E76FAF3F199F899E3CC06
- DK: 2DABD01C7D4623009F20CCCC7894CC22
- WDK: 0ACA654A418C611E7154C1893C54FA931AFDECDD217FC17462E13156AF6B009C
- SKS1: AECCE449D424B0B204C5D10BC545F4A5
- SKS2: 44F222EB55ABB872A7DB9AA2955597F6

Figure 10

```
S3 GkO: {
    version: bit (8)
    extensionCount: unsigned int (32)
    extensions: Extension [extensionCount]
}

Extension: {
    size: unsigned int (32)
    type: bit(32)
    criticalFlag: bit (8)
    payload: bit (8) [size-9]
}
```

Figure 11

MANAGED CONTENT DISTRIBUTION SYSTEMS AND METHODS

RELATED APPLICATIONS

This application claims the benefit of priority under 35 U.S.C. § 119(e) to U.S. Provisional Patent Application No. 62/474,384, filed Mar. 21, 2017, and entitled "Managed Content Distribution Systems and Methods" and U.S. Provisional Application No. 62/638,021, filed Mar. 2, 2018, and entitled "Content Management Systems and Methods" the contents of both of which are hereby incorporated by reference in their entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing the distribution of electronic content. More specifically, but not exclusively, the present disclosure relates to systems and methods for the secure management and distribution of electronic content over broadcast and/or broadband communication channels.

Broadcast content signals such as, for example, satellite signals and/or broadcast television signals, may use a conditional access system ("CAS") to protect associated content. A broadcast content signal such as, for example, a MPEG-2 transport stream ("TS") signal, may include a field that includes a usage rule and/or key that is used by a specialized module and/or hardware (e.g., decryption smart cards) included in a television and/or an associated set top box to implement CAS functionality. Corresponding specialized CAS functionality and/or hardware may be further included in a backend of a broadcast system service. Implementing specialized CAS hardware and/or functionality, however, may be relatively expensive and may not offer certain management flexibility.

Embodiments disclosed herein may implement content management functionality using, at least in part, a digital rights management ("DRM") service. In certain embodiments, this may reduce certain specialized hardware requirements associated with a broadcast CAS architecture, and may provide for more flexible content management.

Certain DRM implementations may involve bilateral communication between a client device and a DRM server, which may not be present in connection with a unidirectional broadcast signal. In addition, DRM services may use relatively large DRM licenses that may not be readily adaptable for transmission in a broadcast signal channel (e.g., MPEG-2 TS) due to their relative size. This constraint may be compounded if there are a large number of broadcast signal subscribers. For example, a size budget for an individual DRM license in a broadcast channel may be 200 bytes or less, whereas a conventional DRM license may be larger than 10 kilobytes.

Embodiments disclosed herein may allow for implementation of a DRM service in connection with bidirectional communication channels and/or unidirectional communication channels such as a broadcast signal. Various embodiments may allow for the generation and/or transmission of a DRM license in a field included in a broadcast signal such as, for example, an entitlement management message ("EMM") field of an MPEG-2 TS signal. The license may be used by a client device to securely manage a received broadcast signal in accordance with associated rules and/or rights in a manner that does not necessarily require the use of a bidirectional communication channel with a remote DRM service (e.g., a DRM service associated with a broadcast service).

BRIEF DESCRIPTION OF THE DRAWINGS

The inventive body of work will be readily understood by referring to the following detailed description in conjunction with the accompanying drawings, in which:

FIG. 8 illustrates a simplified example of the distribution and processing of a group key object and an associated extended persistent license consistent with various embodiments disclosed herein.

FIG. 9 illustrates an example of an extended persistent license definition consistent with various embodiments disclosed herein FIG. 10 illustrates an example of key derivation consistent with various embodiments disclosed herein.

FIG. 11 illustrates an example of a group key object definition consistent with various embodiments disclosed herein

DETAILED DESCRIPTION

Figure 1:
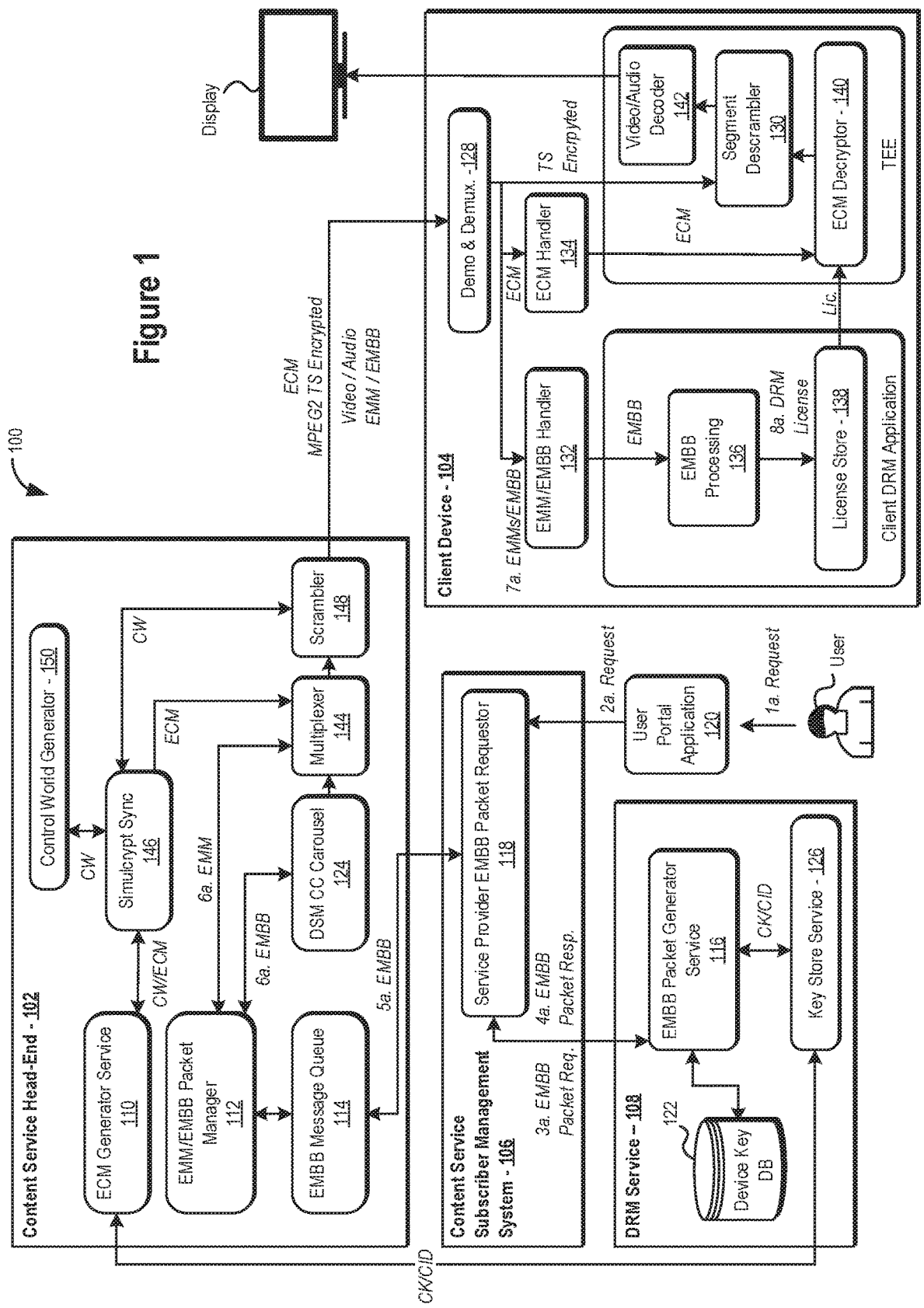
FIG. 1 illustrates an example of a content management architecture for a broadcast client device consistent with various embodiments of the present disclosure.

A description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numbers or descriptions. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Embodiments disclosed herein may allow for the secure management of content distributed to one or more client devices. In certain embodiments, content management functionality may be implemented using, at least in part, a DRM service. Various embodiments provide for a DRM licensing, distribution, and/or enforcement architecture that may be implemented in connection with a client device configured to interact with a content and/or a license service via a bidirectional communication channel, such as a broadband Internet connection, and/or unidirectional communication channel, such as a broadcast signal. In this manner, various embodiments may provide for secure and relatively cost-effective (in some instances card-less) content access management that, among other things, enables secure playback of scrambled digital video broadcasting ("DVB") signals, as well as over-the-top ("OTT") streams on connected devices (e.g., smart TVs, set top boxes, etc.).

Consistent with various embodiments, a client device may comprise a television, a set top box, a streaming and/or other content device, and/or any other system and/or device that may be used in connection with receiving, managing, and/or displaying broadcast and/or broadband content. In some embodiments, a client device may comprise a broadcast device ("BOD"), which may not necessarily be capable of bidirectional communication with one or more other systems and/or services. In further embodiments, a client device may comprise a connected device, which may be capable of receiving content and/or other information and/or transmitting information to/from one or more systems and/or services via a communication channel. In some embodiments, a connected device may comprise a connected broadcast device ("CBD"), which may be capable of receiving content from a broadcast channel (or other unidirectional communication channel) and/or a bidirectional communication channel, such as an active broadband connection and/or the Internet. For example, a client device may comprise a hybrid device supporting both broadcast and OTT connectivity.

Broadcast Content Management Architecture

FIG. 1 illustrates an example of a content management architecture 100 for a broadcast client device consistent with various embodiments of the present disclosure. As illustrated, the content management architecture 100 may include a content service head-end 102. The content service head-end 102 may, among other things, be configured to scramble a cleartext broadcast TS using a control word ("CW") and/or to transmit the scrambled TS over the broadcast channel. In various embodiments, the content service head-end 102 may be further configured to generate, distribute, and/or otherwise manage EMMs, entitlement message broadband container ("EMBB") messages, and/or entitlement control messages ("ECM") using one or more of an ECM generator service 110, an EMM/EMBB packet manager 112, and/or EMBB message queue 114, which are described in more detail below. In certain implementations where a broadband connection is available (e.g., as may be the case in connection with a CBD), the content service head-end 102 may not necessarily manage and/or distribute EMBBs/EMMs, as licenses may be obtained via the broadband connection.

Consistent with various disclosed embodiments, an EMBB message may be a relatively simple container formatted message that may allow DRM licenses to be carried to client devices. An EMBB message may be distributed as part of an EMM payload and/or multiplexed with a TS, and/or via single files through a digital storage media command and control ("DSM CC") carousel 124. Various embodiments may provide for a DRM service 108 that exposes an application programming interface ("API") of a service 116 that allows a content service to request EMBB packets. As described in more detail below, an EMBB packet may include a broadband license and/or a broadcast extended persistent license ("EPL").

A content service subscriber management system 106 may be configured to manage an interface between a user and/or customer relationship manager ("CRM") and/or a system that may activate program(s) and/or broadcast channels on a client device 104 associated with a user. As illustrated, the content service subscriber management system 106 may interface with an API associated with a DRM service 108. For example, the content service subscriber management system 106 may interact with an API of an EMBB packet generator service 116 to request EMBB packets that contain DRM license material.

In some embodiments, a content service provider EMBB packet requestor 118 of the content service subscriber management system 106 may be configured to issue EMBB packet requests to the API of the EMBB packet generator service 116 of the DRM service 108. For example, in some embodiments, a user may interface with a portal application 120 (e.g., a web interface, a mobile application, and/or the like) in connection with requesting the activation of a specific channel, group of channels, and/or service. The content service provider EMBB packet requestor 118 may match an identifier of the user included in the request with an identifier associated with a client device 104. The device ID, which may be a node identifier, may be used to request EMBB packets from the DRM service 108. In some embodiments, the request may include information such as a content key ("CK"), a content ID ("CID"), and/or other license obligations such as a rental and/or expiration period. The content service provider EMBB packet requestor 118 may be further configured to forward EMBB packets obtained from the DRM service 108 to the content service head-end 102 for further distribution.

The DRM service 108 may expose an API that may allow the content service provider EMBB packet requestor 118 to request EMBB packets with embedded DRM licenses (and/or tokens in connection with CBDs, as described in more detail below) and/or to manage CKs and CIDs. For example, as described above, an EMBB Packet generator service 116 may be exposed via an API and be used to generate EMBB packets. In certain embodiments, this service may receive as input information a device ID, license terms (e.g., a rental and/or expiration time), output obligations, and/or the like, and may return an EMBB packet. DRM licenses embedded in generated EMBB packets may be generated for specific device keys. In some embodiments, the API exposed by the DRM service 108 for issuing DRM licenses may be a REST API, and may include logging and/or monitoring functions.

Devices (e.g., client device 104) may be provisioned with unique public key pairs and/or unique symmetric keys. One or more of these keys, which may be referred to herein as device keys, may be used to encrypt CKs in EMBB packets sent to devices. In some embodiments, when symmetric keys are used, the device keys may be derived from a highly confidential device key using a secure key derivation function ("KDF"). In this manner, the security of highly confidential manufacturer device keys may be maintained. In various embodiments, such a derived device key may be used to encrypt the CK.

A device key database 122 may include device keys of registered client devices 104. In certain embodiments, the device key database 122 may be internal to the DRM service 108 and may be protected and/or otherwise not directly accessible by third parties.

A key storage service 126 may expose an API that allows an operator (e.g., a content and/or broadcast service) to manage CKs, CIDs, and/or their correlations. In some embodiments, the key storage service 126 may store and/or otherwise manage metadata associated with CKs in addition to the CKs themselves.

In the architecture 100 illustrated in FIG. 1, the client device 104 may comprise a BOD that in some instances may not be connected to a broadband network. The client device 104 may be able to consume and/or otherwise render and/or display protected content if it has received the licenses for doing so. In some embodiments, the client device 104 may include a demodulator and/or demultiplexer module 128. The demodulator and/or demultiplexer module 128 may be configured to receive and/or demultiplex a broadcast signal (e.g., a MPEG2 TS signal) received from the content service head-end 102. The demodulator and/or demultiplexer module 128 may be configured to pass TS packets (e.g., encrypted TS packets) in the broadcast signal to a descrambler 130 while ECM, EMM, and/or EMBB packets may be passed to other respective data handlers 132, 134.

An EMM/EMBB handler 132 may be configured to receive EMBB packets from the DSM CC carousel 124 and forward the packets to a client DRM application API associated with the client device 104. In some embodiments, the EMM/EMBB handler 132 may be part of a middleware and/or application layer of the client device 104 (e.g., a hybrid broadcast broadband TV ("HbbTV") application). If EMBB packets are delivered via EMMs, the EMM/EMBB handler 132 may be configured to extract the EMBB payload from the EMM and pass it to the client DRM application API.

In some embodiments, the client DRM application may include a EMBB processor 136 that may process and/or otherwise extract a DRM license from a received EMBB. The EMBB processor 136 may call an API of a license store 138 to store the extracted DRM license.

An ECM handler 134 may be configured for receiving and handling ECM packets from the incoming TS. A segment descrambler 130 may be configured to decrypt incoming TS content packets. In some embodiments, decryption operations may utilize an associated CW. In certain embodiments, the CW may be retrieved from the ECM using an ECM decryptor 140 extension to the client DRM application.

Decrypted content packets may be transmitted from the descrambler 130 to a video and/or audio decoder 142, which may be sent to a display and/or other content rendering system associated with the client device 104. In some embodiments, the content rendering system may be integrated with the client device 104. In further embodiments, the content rendering system may be separate from the client device 104 (e.g., as may be the case with a set top box).

In various embodiments, the client device 104 may include one or more execution environments such as, for example, one or more rich execution environments ("REEs") and one or more trusted and/or otherwise protected/secure execution environments ("TEEs"). As illustrated, in certain embodiments, the client DRM application may execute and/or otherwise operate within a REE. In further embodiments, the client DRM application and/or aspects thereof may execute and/or otherwise operate within the TEE and/or another protected, trusted, and/or secure execution environment.

As discussed in more detail below, the architecture 100 may include a personalization service. For example, a certificate authority may be used to implement a service for personalizing client devices (e.g., client device 104). In some embodiments, the client DRM application of the client device 104 may be activated upon receiving a personalization packet from the personalization service that may include a set of device keys and/or other credentials.

The content service head-end 102 may comprise an ECM generator service 110. The ECM generator service 110 may generate ECMs using CWs and CIDs as input parameters and may distribute the ECMs to the broadcast network. In certain embodiments, the ECM generator service 110 may be configured to interface with the key storage service 126 of the DRM service 108 and/or another key management service for managing, storing, and/or otherwise accessing CKs and/or CIDs. An EMM/EMBB packet manager 112 of the content service head-end 104 may receive EMBB packets from the service provider EMBB packet requestor 118 and place the received EMBB packets in a EMBB message queue 114 for inclusion in the TS. A Simulcrypt synchronizer 146 and/or other TS segment scrambler may be used to scramble TS segments using an associated CW (e.g., a CW generated by a CW generator 150).

In connection with a content distribution and/or management process using the illustrated architecture 100, a user may issue a request to a user portal application 120—step 1a.—which may comprise a system, a web interface, and/or an application (e.g., a mobile application, and/or the like) used for requesting the activation of a specific channel, group of channels, and/or service from the content service. In this manner, the request may comprise an out of band request for entitlement and/or service activation.

The user portal application 120 may issue a request—step 2a.—on behalf of the user to the service provider EMBB packet requestor 118 of the content service subscriber management system 106 for the entitlement and/or service activation. The service provider EMBB packet requestor 118 may issue an EMBB packet request—step 3a.—to the EMBB packet generator service 116 of the DRM service 108. The EMBB packet generator service 116 may accept a device ID, CID, CK, license terms, and/or the like.

An EMBB packet generated based on the request may be returned—step 4a.—from the EMBB packet generator service 116 to the service provider EMBB packet requestor 118. In some embodiments, the EMBB packet may comprise DRM license material which may be targeted to a device key of the client device 104. The EMBB packet may be in a variety of formats including, for example, JavaScript Object Notation ("JSON") and/or Binary format.

The EMBB packet may be transmitted—step 5a.—from the service provider EMBB packet requestor 118 to the EMBB message queue 114 for further handling by the EMM/EMBB packet manager 112 of the content service head-end 102.

An EMM/EMBB packet may be placed—step 6a.—in either a DSM CC carousel 124 or in an EMM message (e.g., based on the preferences of a content service) and passed down to a multiplexer 144 for muxing with the TS. A scrambler module 148 may be configured to scramble and/or otherwise encrypt a cleartext broadcast TS using a CW.

The demodulator and/or demultiplexer module 128 of the client device 104 may be configured to receive and/or demultiplex the broadcast signal (e.g., a MPEG2 TS signal) received from the content service head-end 102. For example, the demodulator and/or demultiplexer module 128 may be configured to pass TS packets (e.g., encrypted TS packets) in the broadcast signal to a descrambler 130 while ECM, EMM, and/or EMBB packets may be passed—step 7a.—to other respective data handlers 132, 134. In certain embodiments, the EMM/EMBB handler 132 may be configured to listen to the DMS CC carousel and/or pass the EMBB (extracting the EMBB from an EMM if appropriate) to the EMBB processor 136.

The EMBB processor 136 may extract the DRM license material from the EMBB packet and store—step 8a.—the DRM license in the license store 138 of the client DRM application.

It will be appreciated that a number of variations can be made to the architecture, relationships, and examples presented in connection with FIG. 1 within the scope of the inventive body of work. For example, certain device, service, system, and/or module functionalities described above may be integrated into a single device, service, system, and/or module, and/or any suitable combination of devices, services, systems, and/or modules in any suitable configuration. Thus it will be appreciated that the architecture, relationships, and examples presented in connection with FIG. 1 are provided for purposes of illustration and explanation, and not limitation.

Client Device Integration

A client device 104 may comprise an integrated DVB stack so that the device 104 may receive a DVB signal. In various embodiments, the client device 104 may include an ECM decryptor 140 configured to obtain a CW and to pass the CW to a segment descrambler 130. As discussed above, the client device 104 may be configured to obtain an EMBB packet either as part of a TS stream (e.g., EMMs) or as part of a DSM CC carousel.

In various embodiments, cryptographic operations performed by the client device 104 may be handled at a system on a chip ("SoC") level. In some embodiments, a secure key box ("SKB") and/or associated API may provide a mechanism for this level of integration. As discussed in more detail below, an SKB may also be implemented via hardened and/or otherwise trusted software. Various embodiments may utilize TEEs and secure video paths ("SVP") supported by associated SoCs.

Figure 2:
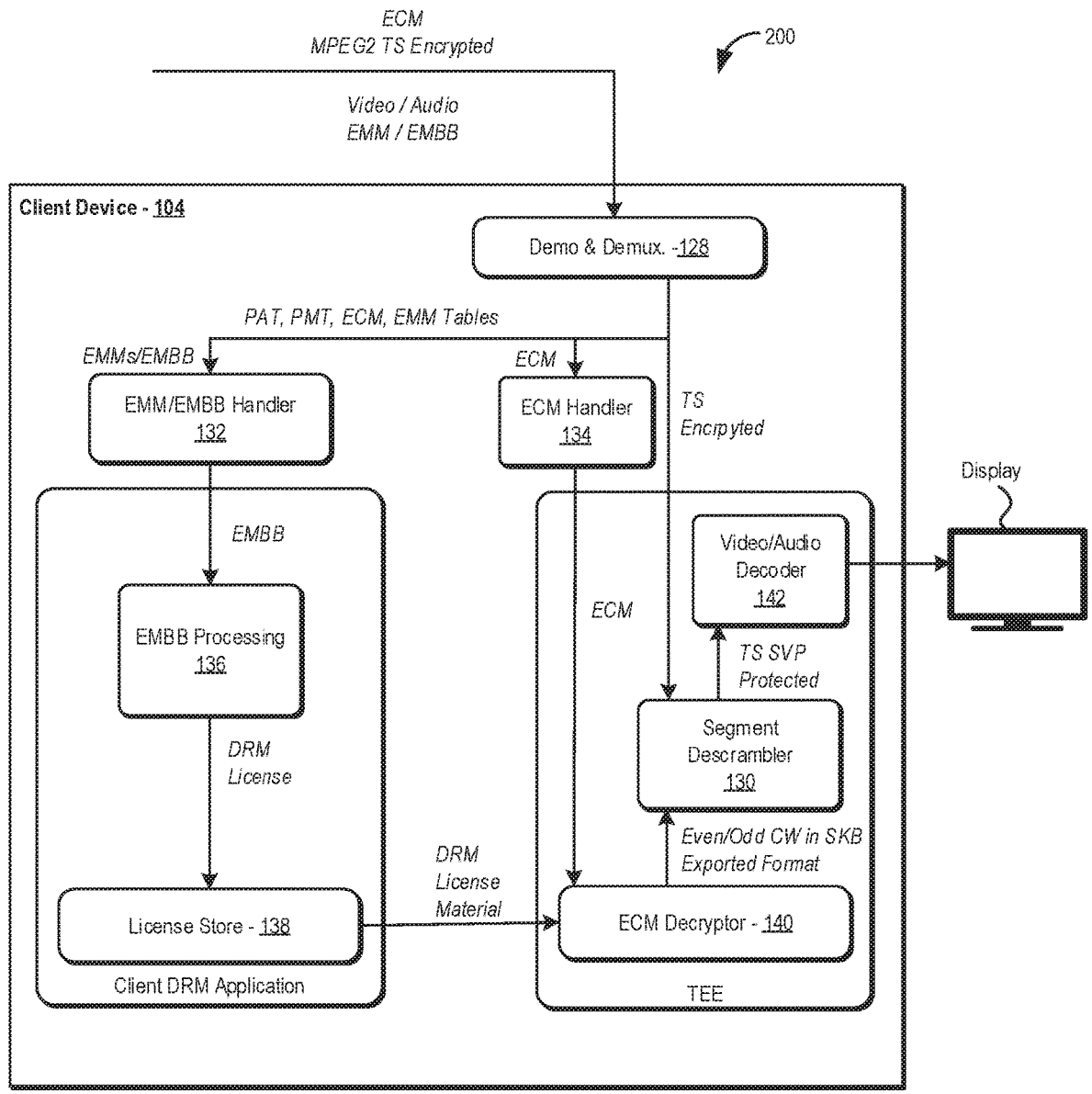
FIG. 2 illustrates an example of an architecture of a broadcast client device consistent with various embodiments of the present disclosure.

FIG. 2 illustrates an example of an architecture 200 of a broadcast client device 104 consistent with various embodiments of the present disclosure. In various embodiments, the broadcast client device 104 may include various modules and/or APIs to allow for processing of EMBB packets, management of program associated table lists ("PATs"), program map tables ("PMTs"), ECM tables, and/or EMM tables, storing and/or managing DRM licenses, and/or ECM decryption based on DRM licenses.

In certain embodiments, the broadcast client 104 device may include a descrambler 130 (e.g., a MPEG2 TS descrambler) that is operable to obtain CWs and/or content keys from the client DRM application and/or an associated API. For example, in some embodiments, the client device 104 may be configured to receive and decrypt ECMs to extract the CW (e.g., using an ECM decryptor 140). In addition, the client device 104 may be configured to descramble TS segments (e.g., MPEG2 TS segments). For example, a segment descrambler 130 may be able to obtain a CW from the ECM decryptor 140 to allow for descrambling of TS segments.

A native SoC API may, in connection with implementing certain disclosed embodiments, implement SKB APIs, extend a SKB with SKB_EXPORT_TARGET_CUSTOM, use a SKB_SecureData_CreateDataFromExported to load traffic keys recovered by an ECM decryptor 140 into a SKB, and/or export them from the SKB into a format that may be defined by the SoC, and/or implement a "LoadSkbExportedTrafficKey( )" function that loads the SoC specific custom SKB exported traffic key into the SoC TS descrambler.

Broadband Content Management Architecture

Figure 3:
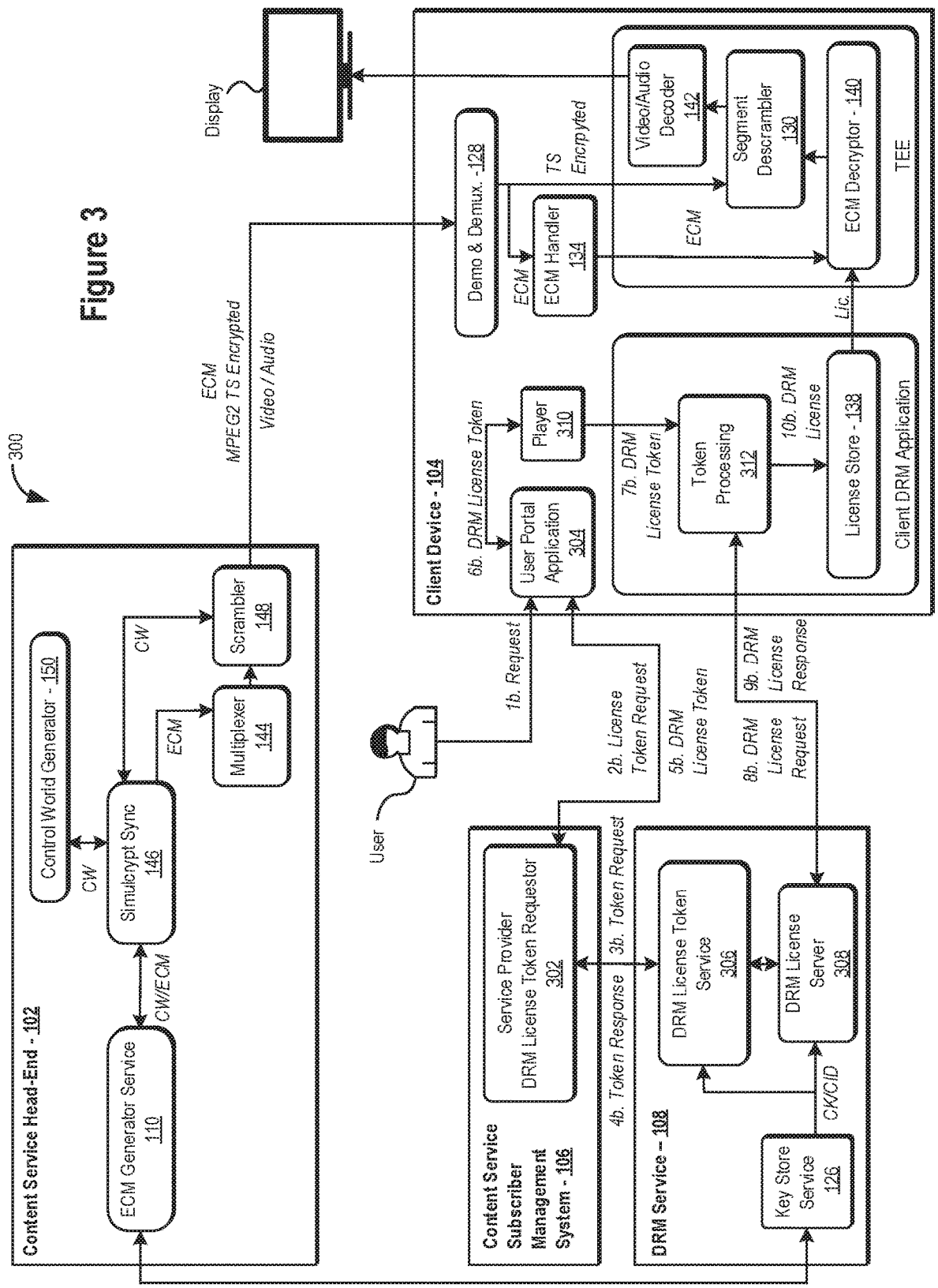
FIG. 3 illustrates an example of a content management architecture for a connected client device consistent with various embodiments of the present disclosure.

FIG. 3 illustrates an example of a content management architecture 300 for a connected client device 104 consistent with various embodiments of the present disclosure. In certain embodiments, the connected client device 104 may comprise a CBD, which may be capable of receiving content from a broadcast channel and/or another unidirectional communication channel in addition to a bidirectional communication channel, such as an active broadband connection and/or the internet. Various elements of the architecture 300 presented in connection with FIG. 3 may be shared and/or otherwise similar to those included in the architecture 100 presented in connection with FIG. 1 and, in some instances, may be designated by like numbers and/or descriptions.

As illustrated, the content service subscriber management system 106 of the architecture 300 may comprise a service provider DRM license token requestor 302 that may be configured to request a DRM license token from a DRM service 108 (e.g., and/or an associated DRM license token service 306). In some embodiments, the service provider DRM license token requestor 302 may request a DRM license token when it receives a request from a user portal application 304 associated with the client device 104 (e.g., in response to a content request issued from a user). The DRM service 108 may return a DRM license token to the user portal application 304. In some embodiments CKs/CIDs may be managed using a key store service 126 of the DRM service 108. In further embodiments, information related to specific licenses may be defined by a broadcast operator and/or content service provider for the specific content based, at least in part, on at least one rule associated with a receiving subscriber.

In various embodiments, the DRM service 108 may expose an API that facilitates requests for DRM license tokens and/or manage CKs and/or CIDs. For example, the DRM service 108 may comprise a DRM license token service 306 that may be configured to issue DRM license tokens and may be accessed via an associated API. The DRM service 108 may further include a DRM license server 308 that returns DRM licenses to the client DRM application of the client device 104 when it is presented with a valid DRM license token. In some embodiments, the DRM license service 308 may be internal to the DRM service 108 and may not necessarily be exposed to third parties.

The connected client device 104 may comprise a connected broadcast device that is connected to a broadband network and/or the Internet. The connected client device 104 may be configured to consume protected broadcast content while obtaining content licenses via a broadcast channel, as described above, and/or from an online connected service (e.g., a connected Internet service).

As illustrated, the connected client device 104 may comprise a player 310 that may interact with a user portal application 304 to request DRM license tokens. The mechanism that the player 310 and the user portal application 304 use to communicate the way that DRM license tokens are requested by the user portal application 304 to the service provider license token requestor 302 of the content service subscriber management system 106 may be configured in a variety of ways, and it will be appreciated that any suitable way of facilitating DRM license token requests may be used in connection with the disclosed embodiments.

Upon receipt of a DRM license token, the player 310 may pass the token to the client DRM application for further processing. The client DRM application may process the token using a suitable token processing module 312, triggering the acquisition of a DRM license from a DRM license server 308 of the DRM service 108. Acquired DRM licenses may be stored in the license store 138 of the client DRM application.

In connection with a content distribution and/or management process using the illustrated architecture 300, a user may issue a request to a user portal application 304—step 1b.—which may comprise an application (e.g., a HbbTV application) allowing users to request the activation of a specific channel, group of channels, program and/or service from the content service.

The user portal application 304 may issue a DRM license token request—step 2b.—on behalf of the user to the service provider license token requestor 302 of the content service subscriber management system 106 for the entitlement and/or service activation. In response, the service provider license token requestor 302 may issue a token request—step 3b.—to the DRM license token service 306 of the DRM service 108. An API of the DRM license token service 306 may accept a device ID, a CID, a CK, license terms, and/or the like.

The DRM license token service 306 may return to the service provider license token requestor 302 a DRM token response—step 4b.—generated based on the received request. The service provider license token requestor 302 may return a corresponding DRM license token—step 5b.—to the user portal application 304 of the client device 104.

Upon receipt of the DRM license token, the user portal application 304 may forward the DRM license token to the player 310—step 6b. Although illustrated as separate applications, it will be appreciated that in some embodiments, certain functionalities of the user portal application 304 and the player 310 may be integrated into a single application.

The player 310 may pass the DRM license token to the client DRM application—step 7b.—which may be responsible for processing the DRM license token to acquire a DRM license. For example, as illustrated, the DRM license token may be passed to a token processing module 312 responsible for acquiring a DRM license based on the DRM license token. The token processing module 312 may communicate a DRM license request to the DRM license service 308 of the DRM service 108—step 8b.—and receive in response a DRM license response—step 9b.—from the DRM license service 308.

The token processing module 312 may extract the DRM license material from the DRM license response and store—step 10a.—the DRM license in the license store 138 of the client DRM application.

It will be appreciated that a number of variations can be made to the architecture, relationships, and examples presented in connection with FIG. 3 within the scope of the inventive body of work. For example, certain device, service, system, and/or module functionalities described above may be integrated into a single device, service, system, and/or module, and/or any suitable combination of devices, services, systems, and/or modules in any suitable configuration. Furthermore, certain aspects of the architecture 300 illustrated in FIG. 3 may be incorporated with certain aspects of the architecture 100 illustrated in FIG. 1 to provide for content management platform where a connected broadcast device can receive DRM license information via either broadcast or broadband channels. Thus it will be appreciated that the architecture, relationships, and examples presented in connection with FIG. 3 are provided for purposes of illustration and explanation, and not limitation.

Data Stream Scrambling and Encryption Keys—ECM Based Scrambling

As discussed above, a data stream, which may comprise an audio and/or video data stream, may be scrambled by a content service head-end. Scrambled information may be encrypted in ECM packets and transmitted within the stream. Consistent with various disclosed embodiments, the decryption of the ECM packets may be managed using DRM licenses that contain the decryption keys and/or DRM rules. These licenses may be communicated to a receiving client device in a variety of ways including:

EMBB packets via a DCM CC carousel—A DSM CC carousel may be used to deliver EMBB packets that contain DRM license material. In this implementation, an Internet and/or other broadband connection may not be necessary in connection with DRM license acquisition and/or enforcement.

EMBB packets via EMM—A EMM packet may be used to encapsulate an EMBB packet and may be muxed as part of a TS. In this implementation, an Internet and/or other broadband connection may not be necessary in connection with DRM license acquisition and/or enforcement.

Via a broadband DRM and/or streaming license acquisition protocol—A receive may obtain licenses from a broadband connection executing a broadband and/or streaming license acquisition protocol.

Figure 4:
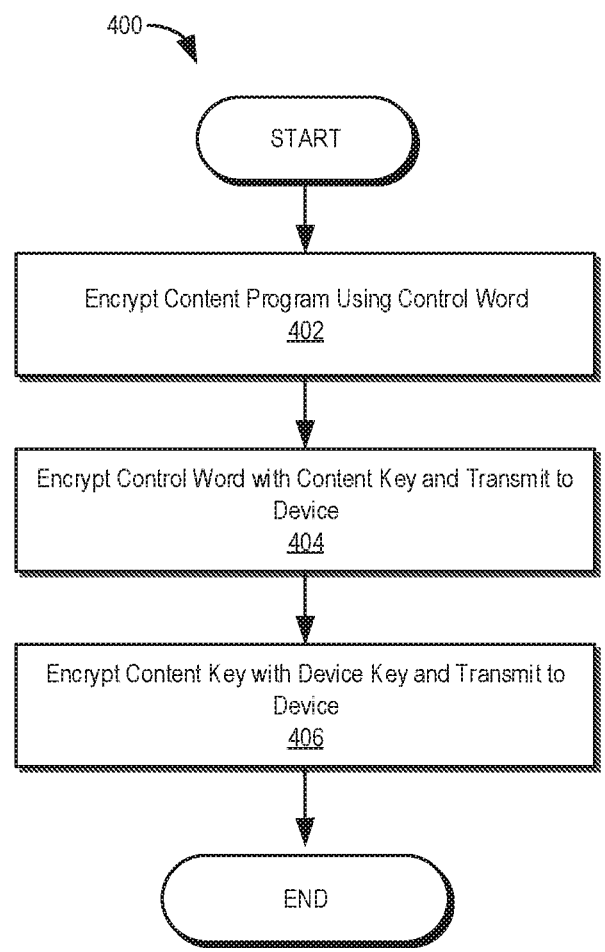
FIG. 4 illustrates an example of a method for encrypting content consistent with certain embodiments disclosed herein.

FIG. 4 illustrates an example of a method 400 for encrypting content consistent with certain embodiments disclosed herein. The illustrated method 400 may be implemented in a variety of ways, including using software, firmware, hardware, and/or any combination thereof. In certain embodiments, various aspects of the method 400 and/or its constituent steps may be performed by a content service head-end, a client device, a content service subscriber management system, a DRM service, and/or any other suitable service/system or combination of services/systems. In certain embodiments, the illustrated method 400 may facilitate encryption of content included in a TS, which may in certain instances be referred to herein as scrambling.

At 402, a content service (e.g., a broadcaster) may encrypt TS packets of a content program P using a key that may be referred to as a CW:

Encrypt (CW, P)=CW (P)

The CW may be encrypted with a content key and transmitted at 404 to a client device via ECM packets:

Encrypt (CK, CW)=CK (CW)

At 406, the CK may then be encrypted with a device key—DevK—associated with the license object (and/or another key encrypted with the device key such as a session key) and transmitted to the client device via either EMBB packets and/or over a broadband connection using a DRM license acquisition protocol consistent with various disclosed embodiments:

Encrypt (DevK, CK)

In some embodiments, pairs of CWs (e.g., odd and even) may be used. In this manner, TS packets may be encrypted alternating between the two scrambling keys. The packet information with the TS may indicate which CW is to be used (e.g., odd or even).

Figure 5:
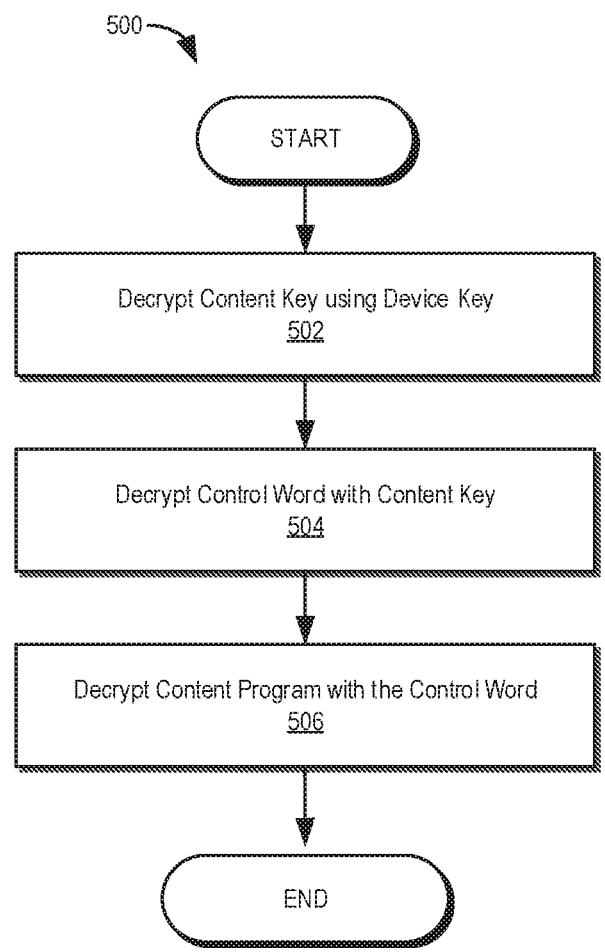
FIG. 5 illustrates an example of a method for descrambling content consistent with certain embodiments disclosed herein.

FIG. 5 illustrates an example of a method 500 for descrambling content consistent with certain embodiments disclosed herein. The illustrated method 500 may be implemented in a variety of ways, including using software, firmware, hardware, and/or any combination thereof. In certain embodiments, various aspects of the method 500 and/or its constituent steps may be performed by a content service head-end, a client device, a content service subscriber management system, a DRM service, and/or any other suitable service/system or combination of services/systems. In certain embodiments, the illustrated method 500 may facilitate decryption of content included in a TS, which may in certain instances be referred to herein as descrambling.

At 502, once a client device has received a DRM license that contains one or more CK/CID pairs, the device may decrypt the CK using the device key (and/or another key encrypted with the device key such as a session key):

Decrypt (DevK, DevK(CK))=CK

The client device may receive the ECM packets included in the TS and, at 504, pass the packets to the client DRM application for decryption. For example, the CW may be decrypted using the CK:

Decrypt (CK, CK(CW))=CW

At 506, the client device may use the decrypted CW to descramble the TS packets of the program P:

Decrypt (CW, CW(P))=P

In various embodiments, the CK may be common to all content programs of a given service provided by the content service provider. In further embodiments, a content service provider may use individual (e.g., different) CKs for specific content programs.

Data Stream Scrambling and Encryption Keys—ECM Based Scrambling

In some circumstances (e.g., as in a closed network and/or when Simulcrypting with different CASs), a content service operator may use a single-key-layer mechanism in connection with managing content consistent with the various disclosed embodiments. In certain embodiments, a single-key-layer mechanism may allow for the use of a CK retrieved from a key store to encrypt a TS payload directly with AES.

Figure 6:
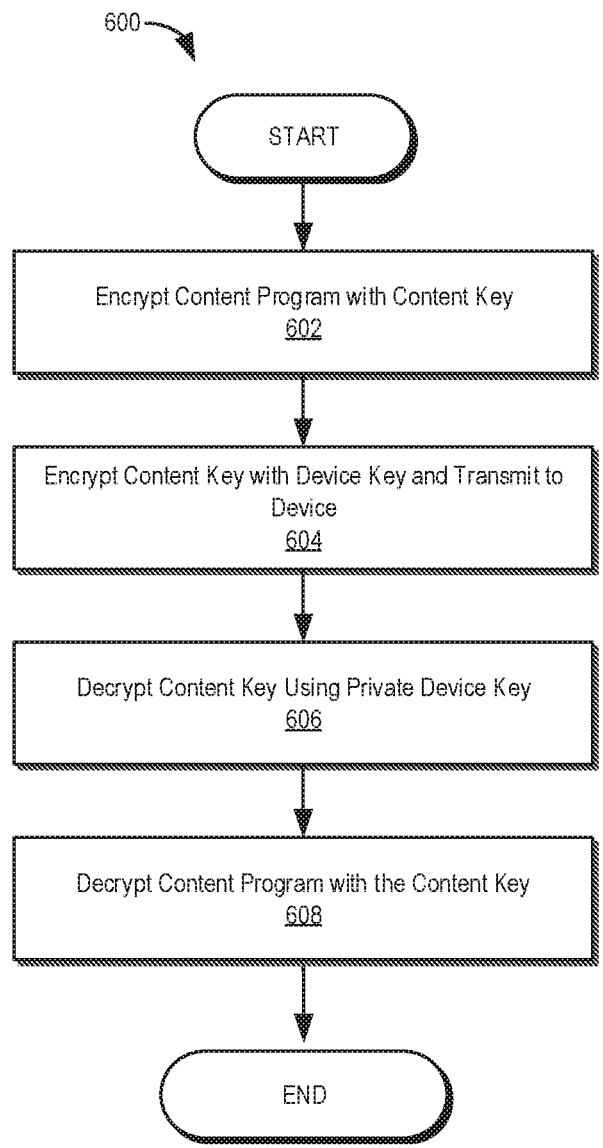
FIG. 6 illustrates an example of a method for scrambling and descrambling content consistent with certain embodiments disclosed herein.

FIG. 6 illustrates an example of a method 600 for scrambling and descrambling content consistent with certain embodiments disclosed herein. The illustrated method 600 may be implemented in a variety of ways, including using software, firmware, hardware, and/or any combination thereof. In certain embodiments, various aspects of the method 600 and/or its constituent steps may be performed by a content service head-end, a client device, a content service subscriber management system, a DRM service, and/or any other suitable service/system or combination of services/systems.

At 602, a content service operator may encrypt TS packets of a content program P using a symmetric key that may be referred to as a content and/or content encryption key CK:

Encrypt (CK, P)=CK (P)

The CK may then be encrypted with a device key—DevK—and associated with a license object at 604 and transmitted to the client device via either EMBB packets and/r over a broadband connection using a DRM license acquisition protocol:

Encrypt (DevK, CK)

At 606, after receiving the DRM license that contains one or more CK/CID pair, the client device may decrypt a received stream using its private device key—PrivK:

Decrypt (DevK, DevK (CK))=CK

The device may use the CK at 608 to decrypt the TS packets of the program P:

Decrypt (CK, CK (P))=P

In some embodiments, the method 600 illustrated in FIG. 6 may simplify the implementation by the content service head-end by reducing requirements for issuing and/or maintaining ECMs.

Key Rotation

In various embodiments, CKs and/or CWs may be rotated. In some embodiments, the content service operator may associate one or more of the following with each content asset (e.g., content streams):

Content URL, content reference ID ("CRID"), and/or another stream source identifier.

A DRM content ID (CID) and/or CK records (e.g., may be common for multiple assets).

A current (CID, CK)[N].

The next two (CID, CK) pair, ((CID, CK))[N+1] and (CID, CK)[N+2]).

Every T (where T represents a time interval decided by an operator, usually hours or days), the following may be performed:

1. A new (CID, CK)[N+3] may be created and (CID, CK)[N] may be discarded. After this operation, the records may contain (CID, CK)[N+1 . . . N+3]

2. A new ECM may be issued with the new DRM content ID and/or content key pair (CID, CK)[N+1].

The CKs/CIDs may be delivered via a DRM license acquisition protocol consistent with various disclosed embodiments, and client devices may be required to acquire valid licenses before being able to consume a protected stream. As discussed above, in connection with broadcast client devices, a DRM license may be delivered via EMBB. To accommodate this, an EMBB carousel may be configured in a manner that ensures delivery of new and/or otherwise updated DRM licenses. Connected broadcast client devices may trigger the request of a DRM license at any time an updated license is needed.

In some embodiments where a single-key-layer mechanism is used, key rotation may comprise changing the CK and delivering the appropriate license accordingly.

Device Activation and License Management—Device Keys

A DRM client application integrated into a client device may be activated once it receives a personalization packet that includes a set of device keys and/or other credentials, which may be referred to as the device's personality, that enable various DRM functions consistent with the disclosed embodiments.

DRM device keys, which may in some instances be referred to generally herein as device keys, and/or other device credentials and/or personality information may be provisioned to a client DRM application as part of a device personalization process in a variety of ways, including, for example:

- Online personalization. The device may acquire the device personality automatically from a DRM service. This type of personalization may use an active broadband connection and may not necessarily be well suited for broadcast client devices.
- Offline personalization. Device personalities may be flashed into a chipset of a client device during one of the manufacturing phases. For example, this option may be suited for set top box and/or TV manufacturers. This type of personalization may not necessarily use an active broadband connection, and may thus be better suited for broadcast client devices and connected broadcast client devices.

In connection with connected broadcast client devices, a content service operator may trigger the online acquisition of the device personality upon the activation of a user subscription via a content service subscriber management system. In connection with broadcast client devices, the activation may be represented by the logic of the subscriber management system that governs whether to issue EMM packets for a specific device and/or user account.

Device Activation and License Management—License Management

In some embodiments, a content service provider may define the logic within their service subscriber management system that governs the issuance of DRM licenses. In addition, the client DRM application may expose an API that allows for management of content licenses stored in the client device.

DRM Licenses

Embodiments disclosed herein may use a DRM service (e.g., a cloud-based DRM service) for content protection across a variety of devices. The DRM service may expose an API that is used by content services and/or providers (e.g., broadcast operators), to request DRM licenses and/or manage content encryption keys and/or related content IDs. Various DRM licenses consistent with embodiments disclosed herein may support a variety of content business models including, for example, electronic sell-through, rental, and/or subscription. Provisioned DRM licenses may be stored in an associated client device. In addition, while DRM licenses may be acquired via a client request, it may also be possible to delivery DRM licenses to non-connected and/or broadcast devices consistent with certain disclosed embodiments.

Broadcast Delivery of DRM Licenses via EMBB Packets

In certain embodiments, a client device may receive EMBB packets via a broadcast packet carousel and/or via EMMs. The EMBB data may be passed to an API associated with a client DRM application executing on the client device configured to handle EMBB packets. The client DRM application may filter the received EMBB packets based on device ID and/or may store associated license data. In some embodiments, the frequency with which EMBB packets are delivered and/or DRM licenses are updated may be based on policies set by a content service provider. Consistent with embodiments disclosed herein, an EMBB payload may comprise a broadband DRM license and/or a streaming extended persistence license ("EPL"), as described in more detail below.

Online Delivery of Broadband DRM Licenses

In some embodiments, a connected broadcast client device may acquire broadband DRM licenses by first requesting one or more licenses for a specific stream and/or set of programs from a portal application (e.g., a user portal application executing on the client device and/or a web portal using an XMLHttpRequest and/or the like). Following the device and/or subscription authentication, the portal application may issue a broadband DRM token from the content service provider and/or an associated content service subscriber management system.

The content service provider and/or an associated content service subscriber management system may use the CKs, CID, and/or other license information to generate a broadband DRM license token request that may be issued to a DRM service via an associated API. The DRM service may generate and return a broadband DRM license token to the content service provider and/or an associated content service subscriber management system, which may forward the broadband DRM license token to the portal application of the client device.

The portal application may generate a response that includes the broadband DRM license token (e.g., an XML file). The client device may use and/or otherwise process the broadband DRM license token using the client DRM application (e.g., accessed via an associated API). The client DRM application may process the token, trigging the acquisition of a broadband DRM license from the DRM service (e.g., from a DRM license server of the DRM service). The acquired broadband DRM license may be stored in a license store of the client DRM application on the client device.

Group Addressing

Various embodiments disclosed herein may use group addressing to allow for delivery of the same EMM to a group of devices. In some embodiments, a content service operator may request an EMBB from a DRM service that includes a group key and/or a group ID for a specific device. The operator may broadcast the EMM with the EMBB generated by the DRM service in response to the request. The client device may obtain the EMM/EMBB and store the group key and/or group ID, thereby joining the group.

Group Licensing

A group of devices may be licensed by a content service operator by first requesting an EMBB including a DRM license from a DRM service for a certain entitlement that targets a specific group ID (e.g., entitlement to view a set of channels and/or the like). The content service operator may broadcast the EMBB obtained from the DRM service to one or more client devices. Target devices may obtain the EMM/EMBB via the broadcast signal and, if the devices belong to the group ID that is addressed in the EMBB packet, then they may process the DRM license; otherwise it may be discarded.

Revocation of Group IDs

A content service operator may remove a device from a group by requesting an EMBB from the DRM service with an associated "remove" command targeting a specific device and/or specific group ID. The content service operator may broadcast an EMM with the EMBB obtained from the DRM service. The target device may obtain the EMM/EMBB via the broadcast and, if the device belongs to the group ID that is addressed in the EMBB packet, it may remove the group ID and/or the group key from its databases and/or licenses that are bound to the group ID.

Example Content Service Provider Implementations

Various embodiments disclosed herein may be implemented in connection with content service provider content delivery architectures in a variety of ways. For example, a service provider may use Simulcrypt to protect MPEG2 TS packets with DRM protection and may deliver the protected packets via IP/UDP to set top boxes. In another example, MPEG2 TS content may be delivered via IP multicast to set top boxes and to mobile clients via HTTP. In another example, MPEG2 TS content streams may be delivered via IP multicast to set top boxes with DRM protection integrated in the SoC consistent with embodiments disclosed herein.

Breach Detection and Mitigation

Embodiments disclosed herein may be used in connection with techniques that allow for remediation in the event of breaches, including revocation, shunning, and/or exclusion. Code protection and/or tamper resistance techniques and/or the use of trusted service providers for creating personality packets (e.g., DevKs, public/private key pairs, and/or symmetric keys, certificates, and/or other information), protecting the roots of trust and keys, their usage, processes, and/or services, and/or maintaining and/or distributing certificate revocation lists ("CRLs") may further be used to enhance security of the architecture.

Certain embodiments may provide for the monitoring and/or detection of cloned client devices. For connected devices, cloned clients may be identified in a network as they would appear to a content service operator as having the same device ID. As each device ID is supposed to be associated with a real user account, a cloned client device would be associated with more than one account. Content service providers may access DRM service logs, which may capture client devices license acquisition activity and may be used to detect cloned devices.

User Data Privacy and Protection

Various aspects of the disclosed embodiments may capture end user information that is needed to deliver services, but many not necessarily collect user identifiers such as such names and/or email addresses. Instead, the DRM service may use online identifiers (e.g., random identifiers) and/or cryptographic keys and certificates to deliver the DRM service. In this manner, personally identifiable information from end users may not be collected and/or stored indefinitely and/or used to protect content, to deactivate client devices, and/or to provision content.

The DRM service may collect transactional log records for billing and/or the benefit of a content service providers auditing and/or debugging activities. These records may comprise one or more of a DRM device ID (or a similar identifier), a content ID assigned by a content service provider, time stamps, and/or other information about usage rules and/or a client DRM application. In some embodiments, the DRM service may not record IP addresses as part of transactional log records.

Content Service Head-End—ECM Generation

As discussed above, in various aspects of the disclosed embodiments, EMBB messages may be used with a DRM service in connection with a linear broadcast stream for targeting client devices that may not be not be connected. Referring back to various aspects of the architectures 100, 300 illustrated in FIG. 1 and FIG. 3, a content service head-end 102 may comprise an ECM generator service 110 (and/or an EMM generator) that may support a Simulcrypt specification. For example, the content service head end 102 may comprise a Simulcrypt synchronizer 146 that may perform one or more of the following:

- Establish transmission control protocol ("TCP") connections with an ECM generator service 110 and/or set up channels per connection (e.g., one channel per connection).
- Set up streams within channels as needed and allow ECM stream ID values.
- Retrieve CWs from a CW generator 150.
- Supply CWs to the ECM generator service 110 on relevant streams, and/or any conditional access specific information.
- Acquire ECMs from the ECM generator service 110.
- Synchronize the ECMs to their associated cryptographic period according to channel parameters.
- Submit ECMs to a multiplexer 144 and/or request their repetition rates according to channel parameters.
- Supply the CW to the scrambler 148 for use in a specific cryptographic period.

The ECM generator service 110 may support a variety of channel messages including setup, test, status, close, and/or error messages. In addition, the ECM generator service 110 may support a variety of stream specific messages including setup, test, status, close request, close response, error, and/or provision messages. In some embodiments, the ECM generator service 110 may be aware of a configuration of the number of channels it has been provisioned for to facilitate the preparation of ECMs.

As discussed above, a ECM generator service 110 may communicate with a DRM service 108 to retrieve a CK to encrypt the ECM for a given channel via an API for accessing the key store service 126. A CID (e.g., uniform_resource_name: operator: channel: rotation_ID) may be provided by the ECM generator service 110 to the key store service 126 to uniquely identify the channel.

In connection with ECM CK rotation, a rotation ID may represent an identifier that indicates how the CK protecting the ECM can be rotated. For example, the rotation ID can be a date, month, and/or year value and may coincide with a CK change over. Receivers may be provisioned with the license to decrypt the ECM prior to the changeover.

In some embodiments, multiple ECM generator services 110 may be provisioned to support an N+1 head-end architecture. At startup, an ECM generator service 110 may load a configuration file containing services to manage, may retrieve a new CK from a key store service 126 using a content service CID, and/or retain a new CK associated with the CID in a local cache.

While running, an ECM generator service 110 may listen for connections from the Simulcrypt synchronizer 146, establish the connections and manage the protocol, retrieve CWs from the Simulcrypt synchronizer 146, encrypt the CW using the CK for the CID (e.g., channel/stream), generate an ECM and respond with the ECM, monitor for changeover times for the CK, retrieve a new CK via the key store service 126 using the next CID based on the rotation model, and/or prepare new ECMs at the point of the changeover as directed by the associated schedule.

Content Service Head-End—EMM Generation

Various embodiments disclosed herein support EMM generation by receiving EMBBs from the content service subscriber management system 106 and/or from a broadcast management system as instructed by the content service subscriber management system 106. In some embodiments EMBB transmission may be supported via broadcast by receiving binary and/or JSON EMBBs from a content service subscriber management system 106.

The service provider EMBB packet requestor 118 associated with the content service subscriber management system 106 may generate licenses based on request from an end user. In further embodiments, the broadcast management system may be instructed by the content service subscriber management system 106 to generate licenses based on the request. The content service subscriber management system 106 may provide the business rules and/or permissions when a license needs to be generated, changed, and/or removed (and/or pass on this information with the request for a license to a broadcast management system).

In some embodiments, the business rules may include the intelligence regarding whether a client device 104 is connected via a broadband connection (e.g., the Internet). Based on whether the client device 104 is connected via a broadband connection the content service may choose a format in which to send messages. For example, the content service can choose to send messages via a broadcast channel, send messages via a broadcast channel when a client device 104 is not connected, and/or may choose to support only connected devices.

If a content service provider wishes for a license to be sent via a broadcast channel, the content service may request an EMBB packet (e.g., a JSON EMBB packet) via an API of an EMBB packet generator service 116 associated with the DRM service 108 (and/or an API of a broadcast management system). The service provider EMBB packet requestor 118 (and/or broadcast management system) may retrieve the EMBB from the DRM service 108 and then format and/or forward the retrieved EMBB license packet to the content service head-end 102.

The EMM/EMBB packet manager 112 may run in the content service head-end 102 and process EMBBs into either a traditional EMM delivery system and/or a carousel delivery system as described above. In further embodiments, an EMM generator may run as part of a broadcast management system local to a content service provider's (e.g., a broadcaster) headend playout system. The EMM generator may process EMBBs into EMMs as described herein.

If EMM delivery is desired, the EMM/EMBB packet manager 112 may be aware of this and may process a received EMBB into a compatible EMM table. An EMM generator may be similarly aware of a particular configuration and may process EMBBs into an EMM. The EMM may be sent to the multiplexer 144 via communication protocol that depends on the interface of the multiplexer 144. In further embodiments, an EMM packet identifier ("PID") stream may be generated.

If EMBB delivery is desired, the EMM/EMBB packet manager 112 may receive the EMBB and inject the EMBB into a DSM CC carousel via a DSM CC carousel player 124. The EMM/EMBB packet manager 112 may be configured to add EMBBs to, remove them from, and/or replace them on the carousel. The EMM/EMBB packet manager 112 may use information provided by a received posting of the EMBB packet (e.g., the appropriate repetition rates, nature of the received EMBBs, expiration of the EMBB, etc.), to manage the structure.

In some embodiments, an EMBB may be posted to the EMM/EMBB packet manager 112 using an appropriate queue. Additional information may be used to manage the EMBB during transmission. Non-limiting examples of pair parameters used to manage an EMBB during transmission are included in Table 1 below:

TABLE 1

| Parameter | Description | Values |
|---|---|---|
| did | Hash value of a device ID. | <value> |
| priority | A priority provided a Simulcrypt synchronizer for license delivery. | VIP \| High \| Med \| Low |
| desiredDT | A date/time when the license is desired to be received by the receiver. After this point, the license may go to a lesser prioritized queue. | <datetime> |
| expiredDT | A date/time when the license should be received by the device. After this date/time, it may no longer be transmitted. | <datetime> |
| requestType | The type of request for the license (e.g., new license and/or retransmission of a prior license). | New\|Republish\|Replacement |

DVB Conditional Access Tables

A conditional access ("CA") table may provide information relating to CA systems used in a stream. In some embodiments, this information may include the location of EMM and EMBB streams. A non-limiting example of a CA table is provided below in Table 2:

TABLE 2

| Item | No. of Bits | Value | Description |
|---|---|---|---|
| Tag: | 8 | 0x09 | 1 |
| Length: | 8 | 0x05 | 20 |
| CA_system_ID | 16 | 0x4af4 | 19188 |
| CA_PID | 16 | 0x1500 | EMM/EMBB PID location |
| Private Data - Type_of_delivery | 8 | 0x01 | 0x01 EMM<br>0x02 EMBB DSM CC Object Carousel<br>0x03 EMBB Stream Events |
| EMBB_Partioning | 8 | 0x00 | 0x00 No partitioning supported<br>0x02 Two character partitioning |
| Association_tag | 16 | 0x0010 | Carousel association tag (may be the same as the stream_component_tag value) |

TABLE 2-continued

| Item | No. of Bits | Value | Description |
|---|---|---|---|
| Carousel_ID | 32 | 0x000000001 | Applicable for EMBB delivery |
| Format_ID | 8 | 0x0000 | Type of carousel |

As described above, various embodiments may support EMMs and EMBBs. The different supported types may be indicated by a "Type_of_delivery" field within a private section of a descriptor in a CA table. This field may further indicate support of various delivery mechanisms for EMBB (e.g., using a DSM CC object carousel, and using DSM CC stream events, etc.).

An EMM PID may carry standard EMM messages based on CA data. A non-limiting example of a EMM PID table is provided below in Table 3:

TABLE 3

| Syntax | No. of Bits | Description |
|---|---|---|
| CA_message_section( ){ | | |
| table_ID | 8 | Device/group specific addressing. |
| section_syntax_indicator | 1 | Indicator bit. |
| DVB_reserved | 1 | Term that may indicate that the field may be used in DVB applications (and/or may not be used in certain private applications). |
| ISO_reserved | 2 | Term may indicate that the value may be used in the future for ISO defined extensions and may not be specified by DVB. |
| CA_section_length | 12 | May specify a number of bytes that follow the section_length field up to the end of the section. |
| for (i=0; I<N; i++){ | | |
| CA_Data_byte | 8 | Field may carry private CA information. The first 16 bytes may be used for device/group specific addressing. |
| } | | |
| } | | |

Certain table IDs may be used for CA messages and/or CA system private information, and/or for user defined structures.

An ECM PID may carry standard ECM messages based on CA data. A non-limiting example of a ECM PID table is provided below in Table 4:

TABLE 4

| Syntax | No. of Bits | Description |
|---|---|---|
| CA_message_section( ){ | | |
| table_ID | 8 | May designate even/odd keys. |
| section_syntax_indicator | 1 | Indicator bit. |
| DVB_reserved | 1 | Term that may indicate that the field may be used in DVB applications (and/or may not be used in certain private applications). |
| ISO_reserved | 2 | Term may indicate that the value may be used in the future for ISO defined extensions and may not be specified by DVB. |
| CA_section_length | 12 | May specify a number of bytes that follow the section_length field up to the end of the section. |
| for (i=0; I<N; i++){ | | |
| CA_Data_byte | 8 | Field may carry key_stream_message CA information. |
| } | | |
| } | | |

The table_ID value may toggle between 0x80 and 0x81 within the CA_message_section.

In an EMBB DSM CC object carousel PID, a CA_descriptor may contain information for the terminal to mount the carousel on the PID defined in the descriptor. Terminals may ignore any service PMT descriptors associated with the same PID. An association_tag may facilitate the association between an associated_tag and the PID on which a service gateway is broadcast. A carousel_ID may be provided in the CA_descriptor in the CA tables to provide an association between a PID and the object carousel.

In an EMBB stream events PID, a CA_descriptor may contain additional information for the terminal to determine the location of the DSM CC stream event on the PID defined in the descriptor. Terminals may ignore any service PMT descriptors associated with the same PID. An association_tag may facilitate the association between the associated_tag and the PID on which the service gateway is broadcast.

Components that have been Simulcrypted and may require CA decryption may be signaled with a CA_descriptor of the component within a PMT of the service containing the encrypted component indicating where the ECM may be located. In certain embodiments, there may be multiple CA_descriptors for different CAs. Table 5, presented below, includes non-limiting examples of CA_descriptors in a PMT table.

TABLE 5

| Item | No. of Bits | Value | Description |
|---|---|---|---|
| Tag: | 8 | 0x09 | CA_descriptor |
| Length: | 8 | 0x04 | Length of the Descriptor |
| CA_system_ID | 16 | 0x4af4 | 19188 |
| CA_PID | 16 | 0x1501 | ECM PID location |

In some embodiments, the CA_Data_byte field may comprise control information such as, for example, parental rating information and/or copy control information. Parental rating information may include, for example, a rating type, an associated rating country code, a country code associated with content, minimal ages associated with ratings, and/or the like. Copy control information may comprise information relating to whether content may be redistributed and/or redistributed only under certain controls, whether image constraints are enforced, whether an analog protection system is used (e.g., copy protection impacting automatic gain control processes), whether content may be copied (e.g., copying not restricted, restricted, one generation copying is permitted, etc.), and/or the like.

EMBB Structure

Various signaling using in connection with certain disclosed embodiments may support "do-it-now" events associated with a Simulcrypt protocol. Content service providers may place "do-it-now" stream descriptors that may be monitored.

A DSM CC carousel may include an EMBB represented as a file with a format defined to be used in connection with the disclosed embodiments. In some embodiments, device IDs and/or device node IDs may be used to identify client devices, terminals, and/or applications. In some embodiments, a hash of these IDs (e.g., a SHA1) may be used. In certain embodiments, filenames of an EMBB may be based in part on a hash of a device node ID. Partitioning of an EMBB that allows distribution across the DSM CC object carousel may be signaled via filename. In various embodiments, partitioning may be set so that the hash of the device node ID is divisible equally.

In some embodiments, a given device may have multiple associated EMBB entitlement messages. Multiple messages may be contained in a concatenated envelope. In various embodiments, DSM CC may allow for version updates. Therefore, the contents may change and this change may be reflected within a DSM CC version number.

In certain embodiments, an object, which may be referred to as an EMBBS object, may include multiple EMBB objects for a given device. The object may include device node hash ID attributes associated with the EMBBs. In some embodiments, an EMBBS object tag may be used to delineate the properties for processing the information.

In connection with acquiring an EMBB, a terminal and/or application may mount a DSM CC carousel where EMBBs are located. The terminal and/or application may determine a device node ID and/or generate a hash of the identifier. The terminal and/or application may request the EMBB (e.g., request the EMBB based on an associated partitioning value). When a request has been made to a DSM CC engine, the engine may access a service gateway. If the resource is unavailable (e.g., a directory cannot be found once all the modules have been acquired), then the DSM CC engine may issue an event indicating that the resource cannot be found at the location of the terminal and/or application. The terminal and/or application may re-request the EMBB (e.g., on a continuous basis as updates may be received on existing acquired EMBBs).

Consistent with various disclosed embodiments, an EMBB packet may be a relatively simple container formatted message that may allow DRM licenses to be carried to client devices. An EMBB packet may be distributed as part of an EMM payload, multiplexed with a TS, and/or via single files through a DSM CC 124. EMBB messages and/or packets may have a defined structure having one or more defined fields.

In various embodiments EMBB messages may be used to transmit DRM content licenses over a broadcast channel to client devices that do not support broadband and/or other connected license acquisition mechanisms. For example, certain client devices may be broadcast-only devices that have not physical means to connect to an IP network and/or connected devices that may be temporarily and/or permanently connected to an IP network (e.g., the Internet). A content service provider may be responsible for transmitting EMBB packets to the client devices (e.g., by muxing them with the TS and/or via a DSM CC carousel).

EMBB Binary Packet Description

Table 6, presented below, provides a non-limiting example of a description of an EMBB packet format in Big-endian notation.

TABLE 6

| Byte Offset | Description | Bytes |
|---|---|---|
| 0 | Target Address | 20 |
| 20 | Transaction ID | 20 |
| 40 | EMBB Version | 1 (unsigned) |
| 41 | Payload Type | 1 |
| 42 | Payload Size | 2 (unsigned) |
| 44 | Payload (possible encoded in Base64) | 0 to 65535 |

EMBB Binary Packet Description—Version

The EMBB Version field may contain a version number of the EMBB format associated with the EMBB packet.

EMBB Binary Packet Description—Target Address

The EMBB Target Address field may include information on how to target the EMBB packet. The EMBB packet can target, for example, a single client device (e.g., via device node ID and/or the like) and/or a group ID of a group key object ("GKO"), as described in more detail below. In some embodiments, the syntax of the of the Target Address field may include:

Device Node ID—The Target Address field may contain 20 bytes of the hash value (e.g., SHA1) of the device node ID.

Group ID—The Target Address field may use the 4 most significant bytes to store the Group ID of the GKO and may set the remaining 16 bytes to 0x00.

A receiving client device may discard any EMBB targeting a Group ID for which there is not matching unexpired GKO stored in the client device.

The Target Address field may contain the hash value (e.g., SHA1) of the device node ID when the payload is a GKO, a command, or an MBB. The Target Address field may contain a hash value (e.g., SHA1) of the device node ID or group ID of the GKO when the payload is an EPL.

Upon receiving an EMBB packet, a client device may compare the value in the Target Address field with a hashed value of its own device ID. If no match occurs, then the device may compare the value of the Target Address field with a value of a valid (e.g., unexpired) group ID contained in its group ID repository. If there is no match, it may compare this value with the hash of each of the group IDs for all the unexpired GKOs stored in the device. If a match occurs, then the EMBB packet may be processed; otherwise, it may be discarded.

EMBB Binary Packet Description—Transaction ID

The EMBB Transaction ID field may include 20 bytes representing a hash (e.g., SHA1) of a unique transaction ID of an EMBB packet. Such a unique ID may be defined by a content service provider and/or another entity responsible for generating the EMBB packets. EMBB packets with duplicate Transaction IDs may be discarded, as in some implementations, only one EMBB packet with a given transaction ID may be permissible at any given time.

EMBB Binary Packet Description—Payload Type

The EMBB Payload Type field may include a byte that indicates the type of payload carried within an EMBB packet. In some embodiments, a bit of the Payload Type field may comprise a flag indicating whether or not the payload is compressed and a plurality of bits may represent a content type. Table 7, presented below, provides a non-limiting example of compression bit flags and type bits of a Payload Type field.

an EMBB JSON formatted packet, the payload may be base conveyed as a Base64 encoded string. A property "compressed" may inform a recipient that the payload was compressed prior to Base64 encoding. If the property "compressed" is absent, then the device may treat the payload as non-compressed.

Table 8, presented below, provides a non-limiting example of a description of EMBB JSON attributes.

TABLE 8

| Field | JSON Attribute Name | Type | Example |
|---|---|---|---|
| Version | "version" | integer | "version" : 0 |
| Target Address | "targetAddress" | string | "targetAddress" : "d42a1f3752bdd8f4ab7da5f5c27234ecdac32648" |
| Transaction ID | "transactionID" | string | "transactionID" : "1f13985f351775eedbce446fb55d015f79f81a46" |
| Compressed | "compressed" | boolean | Indicates if payload is compressed prior to being Base64 encoded. May be assumed "compressed" : false if the property is not present in the JSON file. "compressed" : true |
| Payload Type | "payloadType" | string | "payloadType" : "mbb" |
| Payload | "payload" | string | "payload" : "..." |

TABLE 7

| Compression Bit Flag | Type Bits | | | Description |
|---|---|---|---|---|
| Bit 7 | Bit 6 | Bit 5 | Bit 4 | |
| 0 | 0 | 0 | 0 | Undefined |
| 0 | 1 | 0 | 0 | MBB License |
| 1 | 1 | 0 | 0 | Compressed MBB License |
| 0 | 0 | 1 | 0 | Command Category 1 with non-compressed payload |
| 1 | 0 | 1 | 0 | Command Category 1 with compressed payload |
| 0 | 1 | 1 | 0 | EPL (non-compressed) |
| 0 | 0 | 1 | 1 | Operator message with non-compressed payload. |
| 1 | 0 | 1 | 1 | Operator message with compressed payload. |
| 0 | 1 | 1 | 1 | GKO (non-compressed) |

In some embodiments, when the payload compression flag is set to 1, then the payload may be compressed (e.g., compressed using a ZIP compatible lossless data compression algorithm prior to Base64 encoding the played). In further embodiments, if the payload is a EPL and/or GKO, it may not be compressed.

EMBB Binary Packet Description—Payload Size

The EMBB Payload Size field may indicate a size in bytes of the base64 encoded payload field and may be represented by an unsigned integer of 2 bytes in length.

EMBB Binary Packet Description—Payload

The EMBB Payload field may include the payload of the EMBB packet. As discussed above, the different types of payload may be optionally compressed and then Base64 encoded. In some embodiments, if the payload format is JSON, receiving devices may Base64 decode the contents of the payload first. If the payload type indicates the contents have been compressed, then the client device may uncompress the results of the decoding process. If the payload format is binary, then the payload may remain unencoded.

EMBB JSON Packet Description

EMBB packets may also be encoded as a JSON document to allow elements of the software stack to operate on it. In Consistent with embodiments disclosed herein, payload types may include MBBs, EPLs, commands ("CMDs"), GKOs, and/or operator messages. A non-limiting example of a JSON EMBB is provided below:

```
{
"version" : 0,
"targetAddress" : "d42a1f3752bdd8f4ab7da5f5c27234ecdac32648",
"transactionID" : "1f13985f351775eedbce446fb55d015f79f81a46",
"compressed" : false,
"payloadType" : "mbb",
"payload" : "PEJ1bmRs ... bmR"
}
```

Multiple EMBBs

A given device may have multiple associated EMBB entitlement messages. In some embodiments, multiple EMBB messages may be contained in a concatenated envelope. An EMBBS object may contain the multiple EMBB objects for a given device. In some embodiments, the EMBBS object may include the "targetAddress" attribute for all the EMBBs.

An EMBBS object flag may be used to contain properties for processing the information. In some embodiments, for broadcast optimization, the "targetAddress" may be removed from the EMBB object in broadcast. Multiple EMBBs may either target a single device (e.g., a device node ID) or a single group ID. A non-limiting example of an array of EMBBs for a given device in broadcast is provided below:

```
{
"EMBBS": {
  "targetAddress" :d42a1f3752bdd8f4ab7da5f5c27234ecdac32648",
  "array" : [{
    "version" : 0,
    "transactionID" : "1f13985f351775eedbce446fb55d015f79f81a46",
    "compressed" : false,
    "payloadType" : "mbb",
    "payload" : "PEJ1bmRs ... bmr"
  },
```

```
{
 "version" : 0
 "transactionID" : "1f13985f351775eedbce446fb55d015f79f81a47",
 "compressed" : false,
 "payloadType" : "mbb",
 "payload" : "db;hEsaabmRs ... smR"
 }]
}
}
```

Processing EMBB Payloads

When a payload type is set to be a MBB, a client device may extract the MBB payload from an EMBB, Base64 decode it (e.g., in the case of JSON format), uncompress it if compressed, and store it in the device license store.

When a payload type is set to be an EPL, the client device may extract it from the EMBB payload and, if the format is JSON, it may be Base64 decoded before storing in the license store. In some embodiments, EPL packets may include a single CID. EPLs may be replaced when another EPL with the same CID is received in an EMBB with a different transaction ID. A non-limiting example of a EPL is provided below:

```
{
"version" : 0,
"targetAddress" :
"D564BFC5072BC21C1E2D927D772611F90ED2697B",
"compressed" : false,
"payloadType" : "ms3epl",
"payload" : "AAAAAdc2eM ... vYY4SW4=",
"transactionID" : "024C5DC7E74A8A97B7873D2B76F9FE9F5FF695A8"
}
```

When a payload type is set to be a GKO, the client device may extract it from the EMBB payload and, if the format is JSON, it may be Base64 decoded before being processed. When processing a GKO, the device may store the group ID and the group key. GKOs may be replaced whenever another GKO with the same group ID is received in an EMBB with a different transaction ID.

When a payload type is set to be a command, the client device may extract it from the EMBB payload, Base64 decode it if it is JSON formatted, uncompress it if compressed, and execute the command as defined. For example, a "remove" command with a "contentID" tag may remove a specific license and/or an array of licenses based on the CID (e.g., remove content licenses matching all of the content references from the license store). In some embodiments, the client device may calculate a hash value of each of the content references (e.g., CIDs) and may delete all matching entries in the license store. In another example, a "remove" command with a "groupID" tag may remove a GKO from its store and/or licenses that are bound to the group ID.

When a payload type is set to be an operator message, the client device may extract it from the EMBB payload, Base64 decode it if it is JSON formatted, and process it. When processing the operator message, the payload may not necessarily be modified by the client device, and the payload may be made available to the client device middleware for further handling.

EPL Distribution and Processing Overview

Figure 7:
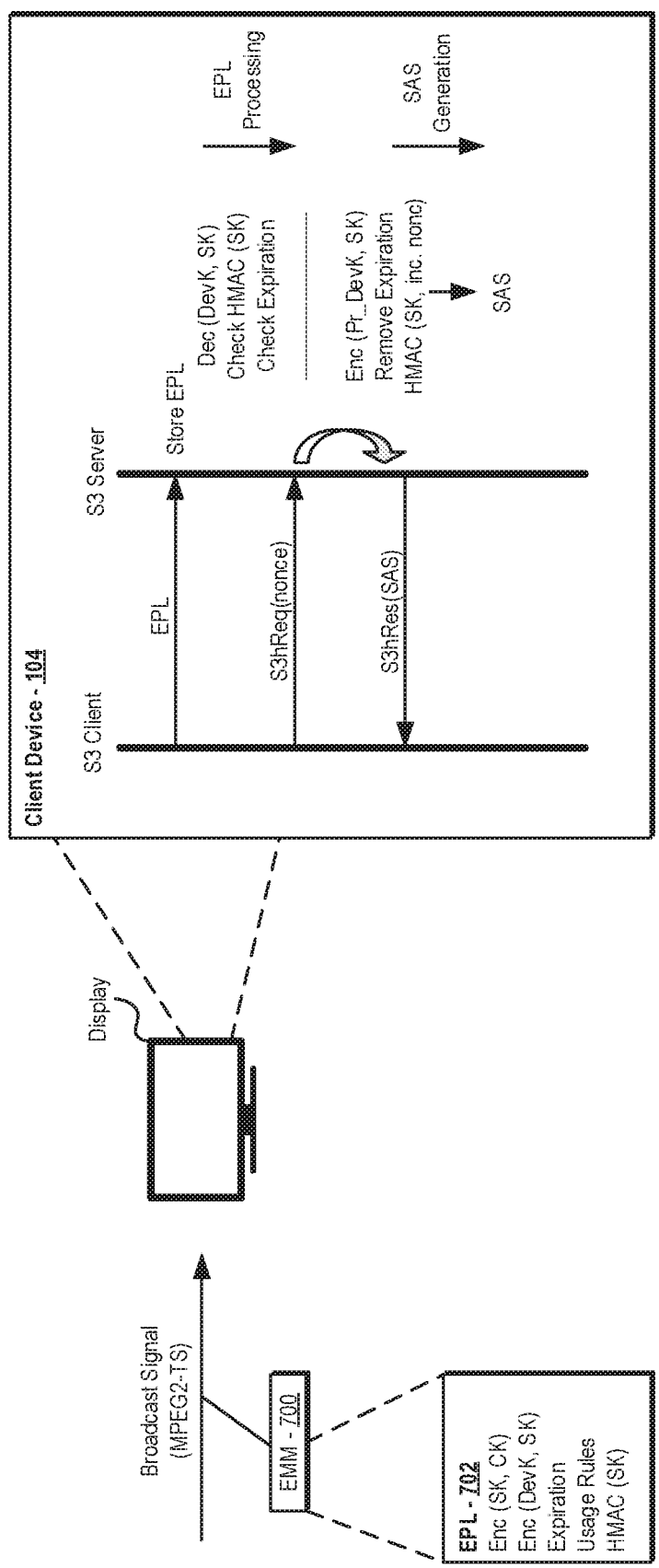
FIG. 7 illustrates a simplified example of the distribution and processing of a broadcast extended persistent license consistent with various embodiments disclosed herein.

FIG. 7 illustrates a simplified example of distribution and processing of an EPL 702 consistent with various embodiments disclosed herein. As illustrated, a broadcast signal, such as a MPEG2-TS signal, may be communicated to a client device 104, such as a television, display, and/or an associated set top box. The broadcast signal may include a content management field, such as an EMM field 700, used to contain key and/or usage rules associated with the broadcast content.

Consistent with various embodiments, the EMM field 700 may include DRM license information, which may be referred to an EPL 702. In some embodiments, the EPL 702 may comprise one or more of:

A content key—CK—encrypted by a session key—SK.

A session key encrypted by a device key—DevK—that may be unique to the client device 104. For example, the device key 104 may comprise a RSA key, an AES key (which may be used in some implementations due to its relatively small size), and/or the like. In certain embodiments, a device manufacturer and/or user may be reluctant to share certain secret and/or private device information and/or associated keys. Accordingly, a key derivation method may be used to generate a key unique to the client device 104 (e.g., generated based on a unique private manufacturer key associated with the device) that is used in connection with the various disclosed embodiments.

An expiration period for the license.

Usage rules associated with the broadcast content.

A signature calculated using the session key (e.g., an HMAC signature).

The client device 104 may include one or more execution environments such as, for example, one or more REEs and one or more trusted and/or otherwise protected/secure execution environments TEEs. In some embodiments, the received EPL 702 may be stored by a TEE of the client device 104 when it is received as part of the broadcast signal.

In various embodiments, a simple secure streaming ("S3") content management protocol may be implemented in connection with content access decisions performed by the client device 104. In connection with the S3 content management protocol, the client device 104 may implement and/or otherwise execute a S3 client application and/or a S3 server application configured to perform various aspects of a content management process consistent with certain disclosed embodiments.

For example, as illustrated, an S3 client may execute on the client device 104 (e.g., execute within an REE and/or another execution environment) and be configured to issue and/or otherwise participate in content access decisions. In certain embodiments, the S3 client may be configured to, at least in part, manage access to broadcast signal content received via unidirectional communication channels and/or streaming content received via bidirectional communication channels.

The S3 client may issue a request to access content associated with the broadband signal to an S3 server application implemented by and/or otherwise executing on the client device 104 (e.g., executing within a TEE and/or another execution environment). In some embodiments, the request may include a nonce.

Upon receipt of the request, the S3 server may process the stored EPL. As illustrated, the session key may be decrypted with the device key. The signature (e.g., the HMAC signature) included in the EPL may be checked for validity and/or the EPL expiration may be checked to see if it has expired.

Following EPL processing, the S3 server may generate a stream access statement ("SAS") response and transmit the response to the S3 client. For example, as illustrated, the session key may be encrypted using a private device key—Pr_DevK—that, in some embodiments, may comprise an RSA key, the expiration may be removed, and an HMAC may be generated using the session key and the nonce, and the generated information may be returned to the S3 client as a S3 response, which may then be used in connection with content access operations (e.g., decryption of content keys using associated session keys and/or the like).

GKO Distribution and Processing Overview

FIG. 8 illustrates a simplified example of distribution and processing of a GKO 804 and an associated EPL 802 consistent with various embodiments disclosed herein. As described above, a content service provider may have a number of subscribers who subscribe to a set of content channels. Various embodiments disclosed herein may use group addressing to allow for delivery of the same licensing information to a group of devices As illustrated in FIG. 8, a content service may associate a set of channels (e.g., plan A) with a subscription group key. A GKO 804 may be generated and distributed to the client device 104. As shown, the GKO 804 may include one or more of:
- A group key—GK—encrypted a by a device key—DevK—unique to the device, such as the device key described above. As noted above, in some embodiments, the DevK may comprise a key derived from a private device key associated with the client device (e.g., a Pr_DevK).
- A signature calculated using the group key (e.g., an HMAC signature).

The client device 104 may receive the GKO 804, decrypt the group key using the device key, and store the group key. In some embodiments, decryption and/or storage of the group key may be performed within a TEE of the client device 104. An EPL 802 received as part of a broadcast signal may be further stored by the client device 104 (e.g., within a TEE of the client device).

Upon receipt of an S3 request, the S3 server of the client device 104 may process the EPL 802. As illustrated, the session key may be decrypted with the stored group key. The signature (e.g., the HMAC signature) included in the EPL 802 may be checked for validity and/or the EPL expiration may be checked to see if it has expired.

Following EPL processing, the S3 server may generate a SAS response and transmit the response to the S3 client. For example, as illustrated, the session key may be encrypted using a private device key—Pr_DevK—that, in some embodiments, may comprise an RSA key, the expiration may be removed, an HMAC may be generated using the session key and the nonce, and the generated information may be returned to the S3 client as a S3 response, which may then be used in connection with content access processes and/or determinations (e.g., decryption of content keys using associated session keys and/or the like).

In various embodiments, use of a group key may allow a content service provider to send a single EPL 802 for use by a number of client devices as long as an associated GKO is provisioned to each device.

S3 Overview and Implementation

Certain streaming DRM platforms may deliver SASs to S3 clients over HTTP or HTTPs. Such SAS objects may be relatively short lived, associated with a current session, and may not be intended to be persisted by the client. An SAS object may comprise a compact representation of various DRM license terms, incorporating technologies such as device binding (e.g., cryptographic binding), output controls, and/or a mechanism for delivering obligations and/or permissions via extensions. In certain DRM implementations, SAS objects may comprise relatively simple structures where the CK may appear in the clear, protected by transport layer security ("TLS") between the client and the service. In further implementations, SAS objects may be transmitted over HTTP where the CK may be encrypted with a key available to the client device and the structure is signed so that it cannot be altered in transit. Such implementations, however, may still be designed to be relatively short lived and involve a bidirectional online connection between the client and the service (as the SAS structure signature may include a nonce generated by the client device).

Consistent with various embodiments of the disclosed systems and methods, an EPL structure may be similar to certain SAS license structures, but may be transmitted in the clear and persisted at a client. In some embodiments, an EPL may reduce the size of the structure associated with the use of public key encryption to protect the secrets in the SAS. Various embodiments may further support CKs that are protected using a group key.

EPL License Structure

FIG. 9 illustrates an example of an EPL definition consistent with various embodiments disclosed herein. In various embodiments, an EPL may include one or more of the following:
- An array (e.g., a 4-byte array) to represent an expiration of the EPL. In some embodiments, if all bytes are zero, the expiration may be infinite. Otherwise, the expiration may be a 4-byte array comprising the byes of the integer value of the expiration date expressed in minuses since the epoch (e.g., 1/1/1977 corresponds to 220924800000 ms since the epoch, or 3682080 minutes, and the 4 bytes of its integer value are represented as 0x00382f20).
- A sign extension. In some embodiments, the sign extension may have a value of 1 and/or include an HMAC-SHA1 signature (using the session key) of the concatenation of the entire EPL payload up to, but not including the sign extension (and in some embodiments not including a nonce).
- An skey extension.
- Optional sks<x> and/or skgk extensions to carry an encrypted session key. An EPL consistent with various disclosed embodiments may use one of a skey, sks<x>, and/or skgk extension to carry an encrypted session key. The payload of these key extensions may use a type value (e.g., a type value for skey) to indicate whether the content key is encrypted directly with a session key and/or with a derived key. Table 9, presented below, provides non-limiting example descriptions of the these optional extensions:

TABLE 9

| ELP Extension Type | Description |
| --- | --- |
| sks<x> | May indicate that a session key is encrypted not with a public device key of a targeted client device but with a unique secret key available only to that device (e.g., a private device key). The payload may comprise an indication of a type (e.g., 0 or 1) and a session key encrypted with the sks<x> using AES-128 cipher in ECB mode. |
| skgk | May indicate that the session key is encrypted with a group key. The payload may comprise an indication of a type (e.g., 0 or 1), a session key encrypted with a 128-bit AES group key using AES-128 cipher in ECB mode, and/or a group ID. |

The sks<x> and/or skgk extensions may be defined similarly to an skey extension and may include a type field and/or an encrypted session key field in a payload.

In some embodiments, the sks<x> extensions may reference a symmetric encryption key which may be defined as follows:

sks<x> parameter x=0: The session key may be encrypted with a key defined and shared by the manufacturer of the client device. The implementation may be responsible for making this key accessible to code processing the EPL.

sks<x> parameter x=1, 2, 3, 4: The session key may be encrypted with one of a series of derivations of a private sharing key, which may be based on the TLS 1.3 HKDF (HMAC-256 based key derivation function). FIG. 10 illustrates an example of key derivations consistent with various embodiments disclosed herein.

EPL Processing

In some embodiments, an EPL may be generated in the absence of an S3 client as its signature may not necessarily include a client supplied nonce. An EPL may be processed by an S3 client. Consistent with various disclosed embodiments, an EPL may be transformed into an SAS. In some embodiments, EPL processing may involve one or more the following actions:

The session key may be decrypted using signaling defined in skey, sks<s>, and/or skgk. In some embodiments, if skgk is present, the GKO referenced by the group ID contained in the skgk extension may be evaluated and used to decrypt the session key. For example, the key encryption key ("KEK") referenced in the GKO may be obtained and used to decrypt the group key. The group key may be used to validate the signature of the GKO. If this validation fails, processing of the EPL may stop. If the signature is validated, and there is no expiration date (expr or expa) in the EPL, the processing may continue. If there is an expiration date (expa), it may be validated and if it has passed, processing of the EPL may stop. If there expiration date is a relative value, it may be checked with it is a first use of the group key. If it is a first use, the absolute expiration date may be computed and stored. If it is not, it may be verified whether the previously stored value has passed. If it has passed, further processing of the EPL may stop.

The EPL signature may be verified using the decrypted session key and, if it fails, further processing of the EPL may stop.

The expiration date in the EPL may be validated and, if it has passed, further processing of the EPL may stop.

When an EPL is transformed into an SAS, it may be further processed by removing any sks<x> and/or skgk extension. If the skey extension is absent (e.g., if sks<x> and/or skgk are used) an skey extension may be computed using a private device key (e.g., a RSA public key) contained in an associated device node supplied in a request for transformation using a KEK derivation type as that signaled in the sks<x> and/or skgk extension. A new sign extension may be computed using the session key. The type of the payload may be set to 0 and the nonce supplied by the request for transformation may be used.

Group Key Objects

In certain embodiments, a group key may comprise a 128-bit symmetric AES key that may be shared by and/or otherwise made available to a set of devices. It may comprise one or more of a binary object that contains one or more of a group ID, a group key encrypted with a key that is available to and/or unique to the device (e.g., as defined by skey and/or sks<s>), an absolute and/or relative expiration date, and/or a signature for integrity. The group key may be used by a client device that has access to the key that encrypts the group key.

FIG. 11 illustrates an example of an GKO definition consistent with various embodiments disclosed herein. Various non-limiting examples of extensions that may be associated with a GKO are provided below in Table 10:

TABLE 10

| Group Key Object Extension Type | Size | Payload |
| --- | --- | --- |
| gkid | — | The group key ID of the object |
| expa or expr (optional - one of) | 4 bytes | This extension may include a 4 byte array comprising the bytes of an integer value. The value may be interpreted as either: The expiration date expressed in minutes since the epoch (e.g., 1/1/1977 00:00 corresponds to 220924800000ms since the epoch, or 3682080 minutes, and the 4 bytes of its integer value are represented as 0x382f20). The number of minutes after first use of the group key object that it shall be valid for. The implementation may be responsible for calculating this relative expiration date upon first use and managing it. If either extension is missing, it may mean that there is no expiration on the object. |
| sks<x> or skey (one of) | — | Designates that the group key is encrypted with a unique symmetric key available only to that device or with the public device key of the device. The payload may be defined as detailed above. |
| Sign | 1 (type) + 20 (signature) | Signature over the group key object up to but excluding the signature extension. Payload may be defined as detailed above. The type may be 1 and the signing key may be the encrypted group key carried in the object. |

Figure 12:
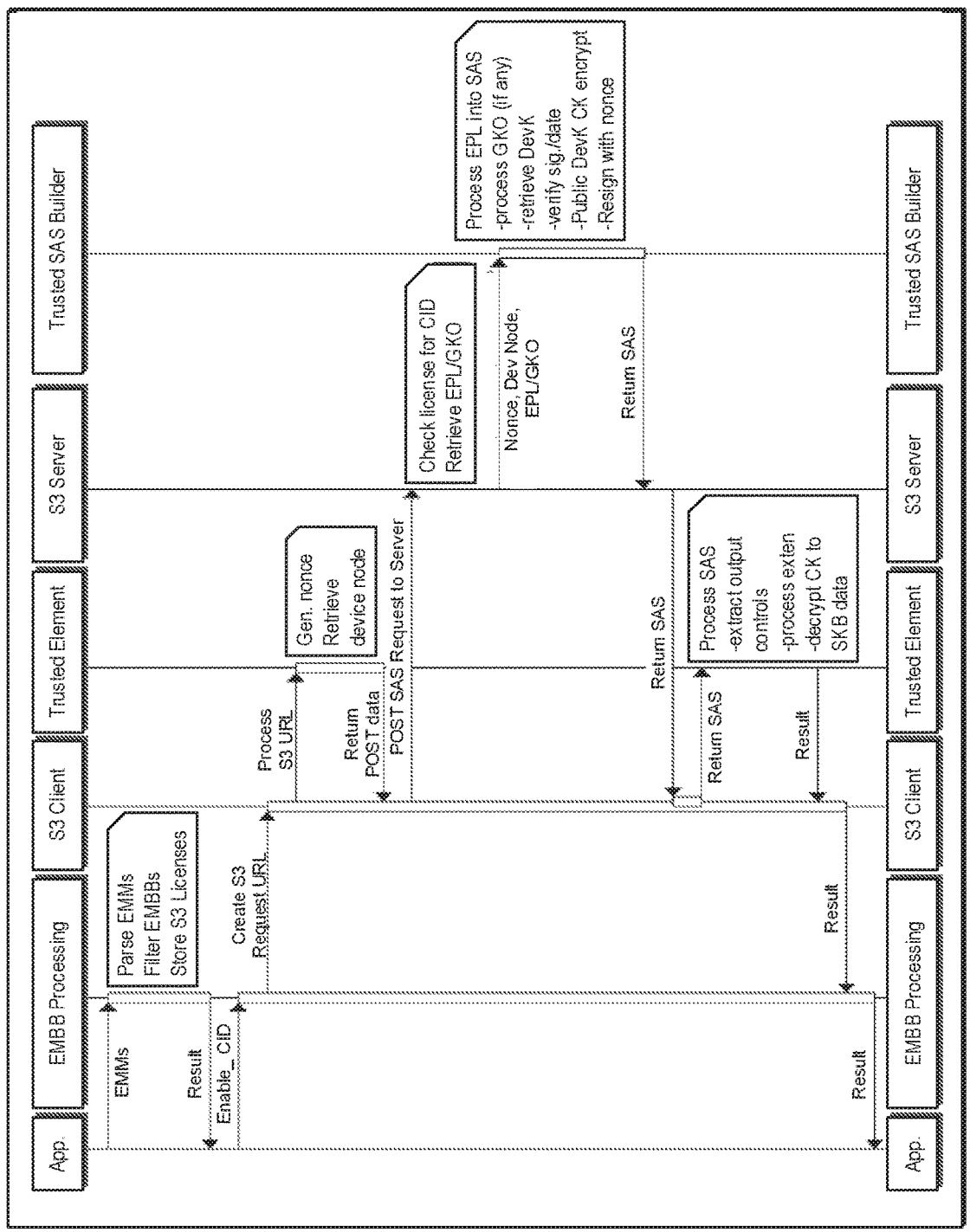
FIG. 12 illustrates an example of a sequence diagram associated with a digital rights management implementation consistent with various aspects of the disclosed embodiments.

FIG. 12 illustrates an example of a sequence diagram associated with a DRM implementation consistent with various aspects of the disclosed embodiments. Various entities illustrated in the diagram include:

Application: A device manufacturer's application that may link to an S3 client application.

EMBB processing: An element that may provide a library that serves as an interface to the application.

S3 Client: A module that provides a handle for the processing of EMBBs and/or SASs.

Trusted element: A trusted module associated with the S3 client that make execute in a TEE.

S3 Server: A client device S3 server that may provide for the management of license requests and/or generation of SASs in connection with the S3 client requests.

SAS Builder: A trusted module that transforms an EPL into a SAS. In some embodiments, it may run in a TEE because it accesses the device's secret keys. The rules of transformation may be as described above.

As illustrated, the application may communicate received EMMs to EMBB processing, where the EMMs may be parsed, EMBBs may be filtered, and associated S3 licenses may be stored. A result of the parsing, filtering, and/or storage operation may be returned to the application by the EMBB processing.

The application may communicate to EMBB processing a request to enable content associated with a particular CID. The EMBB processing may generate a S3 Request URL which may be communicated to the S3 client. The S3 client may interact with the associated trusted element to process the S3 URL by generating a nonce, retrieving a public device node, and formulating a S3 POST request body based on the nonce and the device public node. The returned POST data may be used by the S3 to issue a POST SAS request the S3 server.

Upon receipt of the request, the S3 server may check for licenses associated with the CID and retrieve an associated EPL and GKO (if applicable). The S3 server may generate a nonce, and communicate the nonce, the device public node, and/or the EPL/GKO to a trusted SAS builder which may execute in a TEE. The trusted SAS builder may process the EPL in an SAS by processing the GKO (if applicable), retrieving the device key, verifying the signature of the request and/or the expiration date of the license, encrypting the CK with the public DevK, and resigning the SAS with the nonce. The returned SAS may be communicated to the S3 server which may communicate it to the S3 client.

The returned SAS may communicate the SAS to the trusted element, which may process the SAS by extracting output controls, processing any extensions, and decrypting the CK. The result may be communicated to the requesting application.

Figure 13:
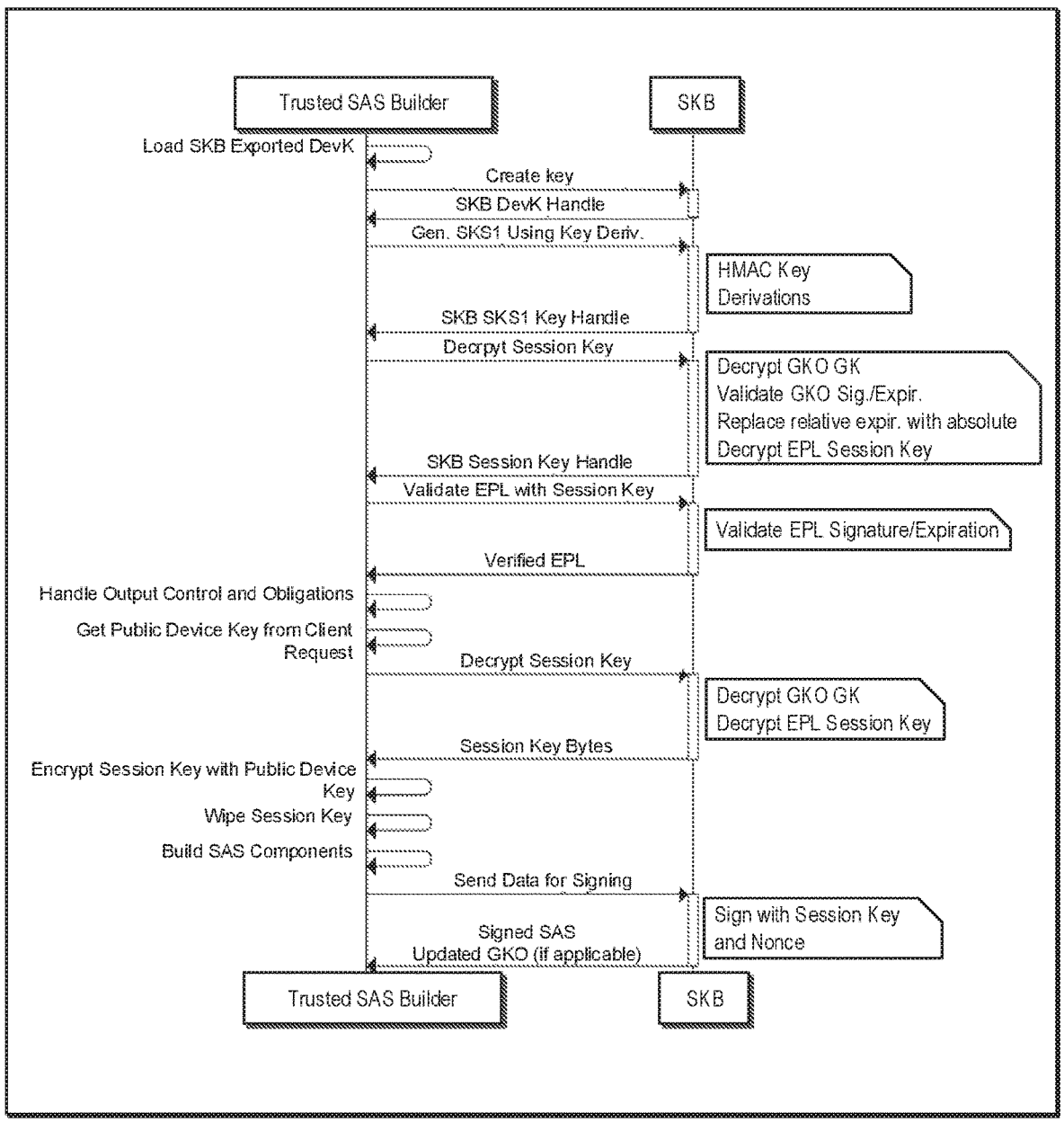
FIG. 13 illustrates an example of trusted interactions with a secure key box consistent with various aspects of the disclosed embodiments.

FIG. 13 illustrates an example of trusted interactions with a SKB consistent with various aspects of the disclosed embodiments. FIG. 13 further illustrates an example of handling of a clear session key outside of an SKB. As illustrated, a trusted SAS builder may load an exported DevK from the SKB. A request to create a key may be issued to the SKB, which may return a DevK handle. A request to generate a derived key from a secret and/or otherwise private device key (e.g., an SKS1 extension type) may be issued to the SKB. Key derivations may be performed and an associated derived key handle may be returned to the trusted SAS builder.

The returned key handle may be used by the trusted SAS builder to generate a request issued to the SKB to decrypt the session key. The SKB may decrypt a GKO GK, validate the GKO signature and/or expiration, replace a relative expiration with an absolute expiration, if applicable, and decrypt a session key associated with an EPL. The SKB may return the key handle of the session key with the SKB.

The trusted SAS builder may request that an EPL be validated with the session key associated with the returned handle. The SKB may validate the EPL signature and/or expiration and return a verification to the trusted SAS builder. The trusted SAS builder may handle output controls and/or obligations, and retrieve a public device key from the client request. A request to decrypt the session key may be issued to the SKB which, in response, may decrypt the GKO GK and the EPL session key and return the session key bytes. The session key may be encrypted by the trusted SAS builder with the public DevK, the session key may be wiped, and components of the SAS may be built. The data may be communicated to the SKB for signing with the session key and/or the nonce. The signed SAS may be returned to the SAS builder with a GKO if applicable.

Figure 14:
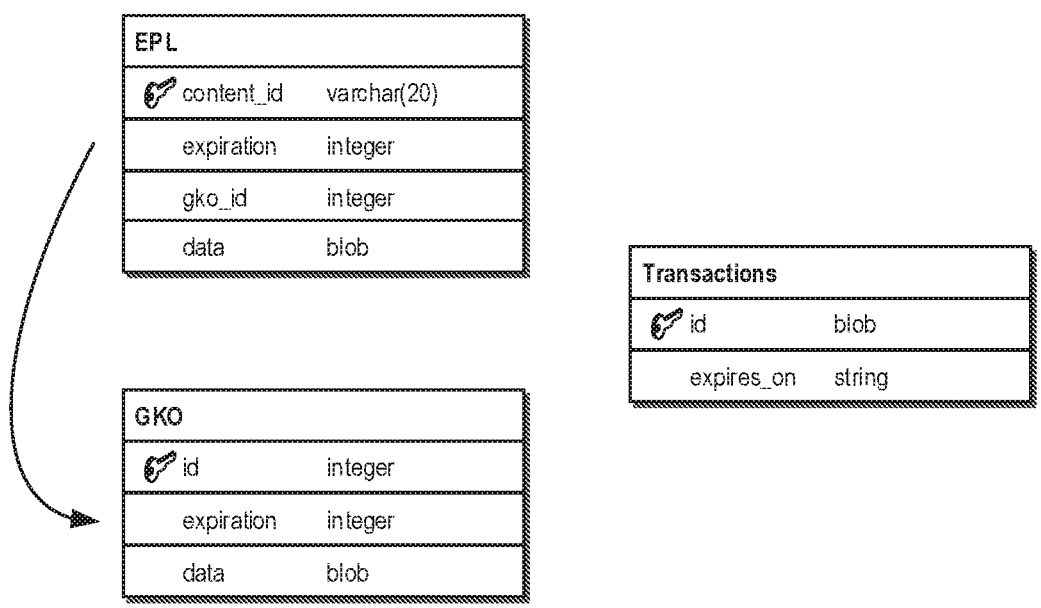
FIG. 14 illustrates an example of a database structure for an entitlement management message consistent with various aspects of the disclosed embodiments.

FIG. 14 illustrates an example of a database structure 1400 for an EMM consistent with various aspects of the disclosed embodiments. It will be appreciated that a variety of suitable database structures may be used in connection with the disclosed embodiments.

EMBB Processing

After initiating an EMBB processor, incoming EMBB packets received as part of a broadcast stream may be processed. The payloads of the processed EMBB packets may comprise one of an EPL, a GKO, an MBB, or a CMD. EMBB packets of EPL, GKO, MBB, or CMD types with a transaction that exists in the EMBB storage and has not expired may be ignored. Otherwise, the EPL, GKO, and/or MBB may be stored in EMBB storage, replacing others if appropriate. In some embodiments, EPLs and GKOs may be stored in an EMBB store and EMMs may be stored in a different license store.

Content with specified CIDs may be enabled to be ready for playback. In some embodiments, a EPL and/or GKO may be first be looked up to derive an associated license. In certain embodiments, if this is not possible, an MBB license may be looked up. Once the license is acquired, it may be evaluated and content may be enabled to be ready for playback based on the evaluation.

For example, in some embodiments, a license may be obtained for specified CIDs. In the case of an EPL or a GKO, the EPL may be looked up with the CID of the request. If the EPL depends on a GKO, the GKO may also be looked up. The Base64 encoded looked up EPL and GKO (if any), may be included as part of a business token in a S3 request URL and/or another suitable pointer. The S3 request URL may be formulated pointed to an S3 server internal to the client device.

A playback enabler module may be initiated with the S3 request URL which may trigger a S3 client to generate a nonce, retrieve a device public node, formulate a S3 POST request body based on the nonce and the device public node, and POST an SAS request to the internal S3 server of the client device.

In some embodiments, one or more execution models may be used (e.g., a SKB in a TEE, TEE porting, etc.). Regardless of the execution model, the S3 server may call an SAS builder module to build an SAS from the EPL and dependent GKO (if applicable). The SAS builder module may retrieve a device private key (and/or a key derived therefrom). In some embodiments, the device private key and/or derived key may be retrieved from a protected SKB. The device private key and/or derived key may be used along with the EPL, GKO (if applicable), nonce, and/or device public node to build the SAS. In an execution module that implements TEE porting, the SAS builder module may reside in a TEE.

In the case of an MBB, an attempt to obtain a working MBB license for the content with the specified CID may performed by calling an associated playback enabler module.

Based on the obtained licenses, a play action may be performed by calling an associated playback enable module. An action validation module may be called to check if the play action is granted and/or to check the action result and/or handle obligations and/or callbacks. Action results may be accepted to obtain content keys, which may be supplied to an internal key manager by calling and appropriate module.

EMBB Object Storage and Retrieval

Received EMBB items of EPL, GKO, and MBB types may be saved into and/or retrieved from storage (e.g., EMBB storage). In various embodiments, EMBBs saved into storage may be assigned item IDs. In some embodiments, EMBBs may be retrieved based on associated item IDs. In certain embodiments EMBBs may be associated with IDs based on item type, and certain ID information may be returned in response to a request based on the item type. For example, if the EMBB item is of an EPL type, a CID may be used, if the EMBB item is of a GKO type, a group key ID may be used, and if the EMBB item is of an MBB type, the CID may be used. Expiration information and/or payload data of received and/or stored EMBBs may be further retrieved.

As part of an EMBB object retrieval process, a request may be initiated to find in the EMBB storage items that contain specified IDs. If the item type is unknown, then lookup operation may be performed on all EPL, GKO, and MBB items. In further embodiments, lookup may be performed for a specific item type.

In some embodiments, when searching for a valid license with a CA having an unknown item type, the lookup operation may first search for an EPL item by CID. If an EPL is found, the expiration date of the EPL may be examined. If it is still valid (e.g., not expired or no expiration date), the EPL may be evaluated to determine whether it references group ID. If the EPL does not reference a group ID, the EPL may be returned.

If the EPL references a group ID, the lookup may search for the GKO by a group ID. If a GKO is found based on the group ID, an expiration date of the GKO may be evaluated. If the GKO is still valid (e.g., not expired or no expiration date), the EPL and GKO may be returned.

If no EPL is found based on the CID, an MBB item may be searched for based on the CID. If an MBB item is found, it may be returned. Further storage and/or management commands may remove individual items from EMBB storage, expunge stored items that have expired, and/or clear stored items.

Air Binding of DRM Licenses

In various embodiments, DRM objects may be defined as format independent (e.g., XML, ASN.1, etc.) and the integrity of a DRM license may be calculated over associated objects without format binding dependency. In some embodiments, DRM licenses may be bound via XML for distribution via the Internet. Due to bandwidth constraints in a broadcast channel and the number of associated subscribers, however, XML binding may have certain drawbacks.

In various embodiments, a different binding, which may be referred to herein as an "air binding" may be used in connection with communicating license information over a broadcast channel (e.g., as EMBB packets). The binding of the DRM licenses may include information associated with the DRM object including IDs of device DRM objects (e.g., control, CK, and/or controller objects), digests of device DRM objects (e.g., control, CK, and/or controller objects), usage rules, and/or a signature using the CK.

Figure 15:
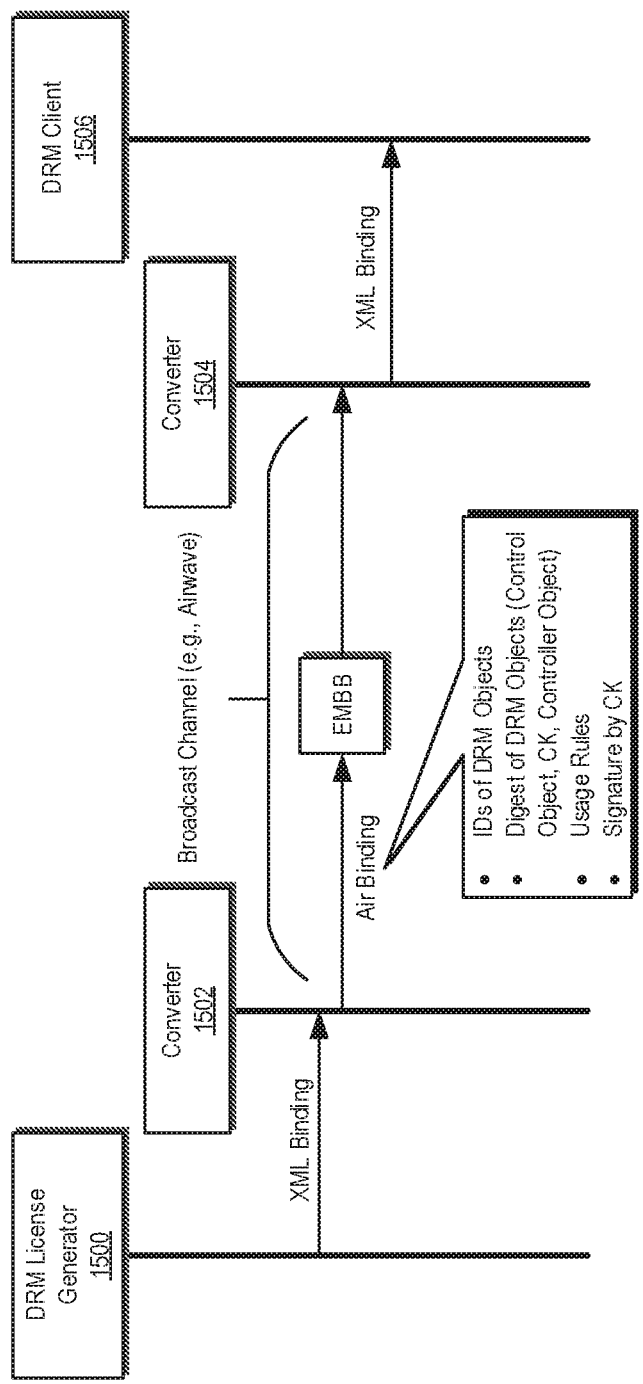
FIG. 15 illustrates an example of communicating a license to a client consistent with various embodiments disclosed herein.

FIG. 15 illustrates an example of communicating a license to a client consistent with various embodiments disclosed herein. As shown, a DRM license generator 1500 may generate a DRM license with an XML binding. The XML binding may be communicated to a converter 1502, which may translate from the XML binding to an air binding for communication via the broadcast channel. At the client side, a converter 1504 may translate from the air binding to an XML binding and communicate the XML bound license to the DRM client 1506. In various embodiments, converters 1502, 1504 may have limited security requirements, as during operation they may only switch bindings without breaking the integrity of associated DRM licenses.

Figure 16:
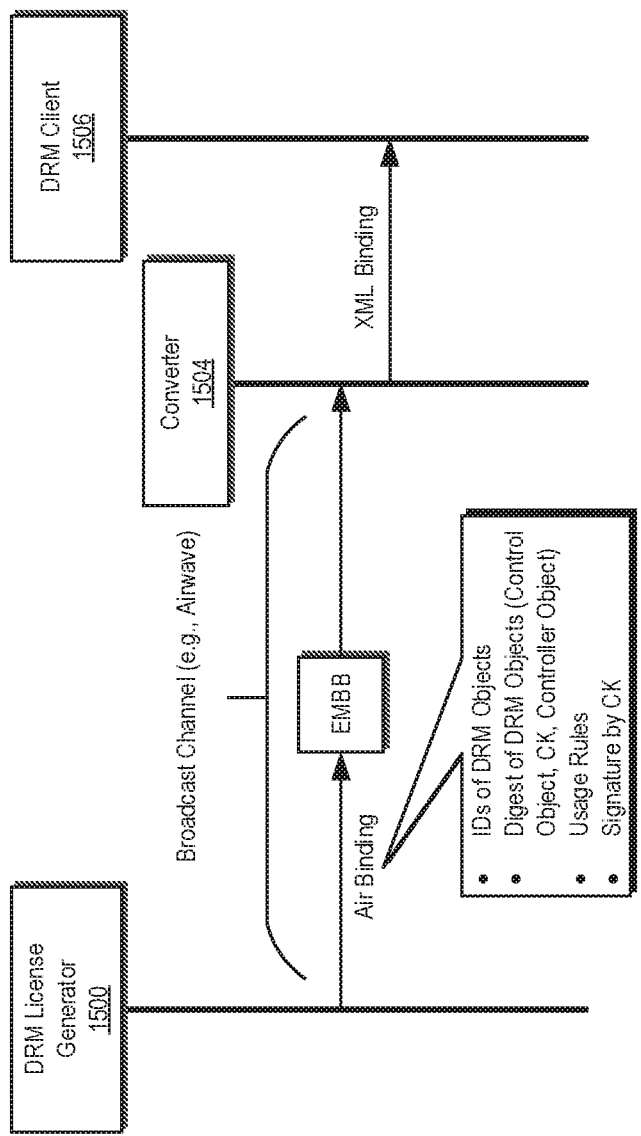
FIG. 16 illustrates another example of communicating a license to a client consistent with various embodiments disclosed herein.
Figure 17:
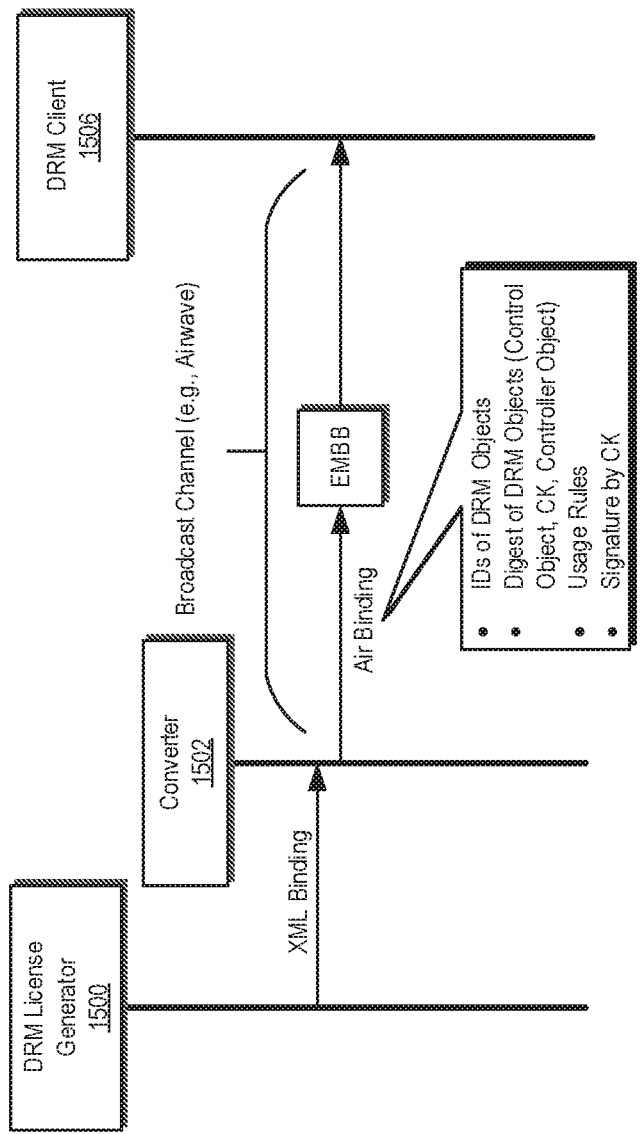
FIG. 17 illustrates a further example of communicating a license to a client consistent with various embodiments disclosed herein.

As illustrated in FIG. 15, in some embodiments, both client-side and server-side converters 1502, 1504 may be used. If the DRM license generator 1500 is capable of issuing an air binding DRM license, then the server-side converter may not be necessary, as is illustrated in FIG. 16. Similarly, if the DRM client 1506 is capable of processing an air binding DRM license, then the client-side converter may not be necessary, as is illustrated in FIG. 17.

Figure 18:
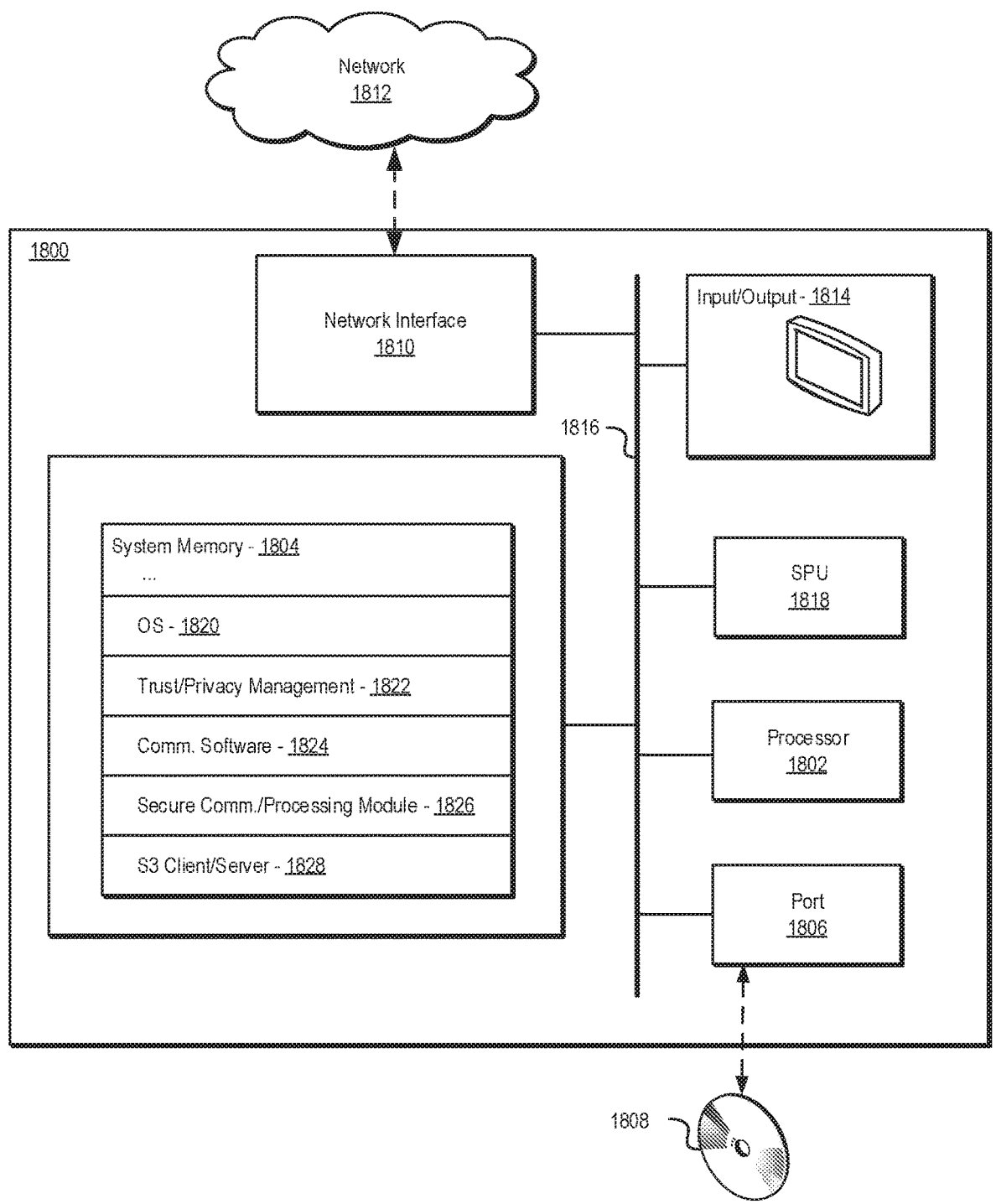
FIG. 18 illustrates an example of a system that may be used to implement certain embodiments of the systems and methods of the present disclosure.

FIG. 18 illustrates an example of a system 1800 that may be used to implement certain embodiments of the systems and methods of the present disclosure. The exemplary system 1800 of FIG. 18 may comprise a system and/or device associated with client device (e.g., a TV and/or set top box), a content service, a DRM service, and/or any other service/system configured to implement embodiments of the disclosed systems and methods Various systems and/or devices associated with embodiments of the disclosed systems and/or methods may be communicatively coupled using a variety of networks and/or network connections. In certain embodiments, the network may comprise a variety of network communication devices and/or channels and may utilize any suitable communications protocols and/or standards facilitating communication between the systems and/or devices. The network may comprise the Internet, a local area network, a virtual private network, and/or any other communication network utilizing one or more electronic communication technologies and/or standards (e.g., Ethernet or the like). In some embodiments, the network may comprise a wireless carrier system such as a personal communications system ("PCS"), and/or any other suitable communication system incorporating any suitable communication standards and/or protocols. In further embodiments, the network may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network may incorporate one or more satellite communication links, broadcast communication links, and/or the like. In yet further embodiments, the network may utilize IEEE's 802.11 standards, Bluetooth®, ultra-wide band ("UWB"), Zigbee®, and or any other suitable standard or standards.

Various systems and/or devices associated with the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, the client device and/or one or more other systems and/or services may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 18, a system 1800 may include: a processing unit 1802; system memory 1804, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit; a port 1806 for interfacing with removable memory 1808 that may include one or more diskettes, optical storage mediums (e.g., flash memory, thumb drives, USB dongles, compact discs, DVDs, etc.) and/or other non-transitory computer-readable storage mediums; a network interface 1810 for communicating with other systems via one or more network connections 1812 using one or more communication technologies; a user interface 1814 that may include a display and/or one or more input/output devices such as, for example, a touchscreen, a keyboard, a mouse, a track pad, and the like; and one or more busses 1816 for communicatively coupling the elements of the system.

In some embodiments, the system may, alternatively or in addition, include an SPU 1818 that is protected from tampering by a user of the system or other entities by utilizing secure physical and/or virtual security techniques. An SPU 1818 can help enhance the security of sensitive operations such as personal information management, trusted credential and/or key management, privacy and policy management, and other aspects of the systems and methods disclosed herein. In certain embodiments, the SPU 1818 may operate in a logically secure processing domain and be configured to protect and operate on secret information, as described herein. In some embodiments, the SPU 1818 may include internal memory storing executable instructions or programs configured to enable the SPU 1818 to perform secure operations, as described herein.

The operation of the system may be generally controlled by a processing unit 1802 and/or an SPU 1818 operating by executing software instructions and programs stored in the system memory (and/or other computer-readable media, such as removable memory 1808). The system memory 1804 may store a variety of executable programs or modules for controlling the operation of the system 1800. For example, the system memory 1804 may include an operating system ("OS") 1820 that may manage and coordinate, at least in part, system hardware resources and provide for common services for execution of various applications and a trust and privacy management system 1822 for implementing trust and privacy management functionality including protection and/or management of personal data through management and/or enforcement of associated policies. The system memory may further include, without limitation, communication software 1824 configured to enable in part communication with and by the system, applications, a secure communication and/processing module 1826 configured to perform various aspects of the disclosed embodiments (e.g., cryptographic key operations, signature generation, license enforcement, etc.), one or more S3 client and/or server applications 1828, and/or any other information and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the embodiments of the invention are not to be limited to the details given herein, but may be modified within the scope and equivalents of the appended claims.

What is claimed is:

1. A method for managing electronic content performed by a client device comprising a processor and a non-transitory computer-readable medium storing instructions that, when executed by the processor, cause the client device to perform the method, the method comprising:
   receiving, by the client device, a broadcast content stream, the broadcast content stream comprising a plurality of encrypted content packets and at least one license information packet;
   processing, by the client device, the license information packet, wherein processing the license information packet comprises:
      decrypting a session key included in the license information packet using a device key associated with the client device,
      verifying a signature of at least a portion of the license information packet using the decrypted session key, and
      determining that the license information packet is valid based on an expiration date included in the licensing information;
   receiving, at the client device, a request to render the broadcast content stream; and
   in response to the request, descrambling the content stream based on the processed license information packet, wherein descrambling the content stream comprises:
      decrypting a content key included in the license information packet using the decrypted session key,
      decrypting an encrypted control word included in the license information packet using the decrypted content key, and
      decrypting the plurality of encrypted content packets using the decrypted control word.

2. The method of claim 1, wherein the broadcast content stream comprises an MPEG2-encoded transport stream.

3. The method of claim 1, wherein processing the license information packet further comprises:

determining that the license information packet has been compressed; and based on the determination, decompressing the license information packet.

4. The method of claim 1, wherein the method further comprises rendering the descrambled content stream.

5. The method of claim 1, wherein the license information packet comprises a binary formatted packet.

6. The method of claim 1, wherein the license information packet comprises an object notation formatted packet.

7. The method of claim 1, wherein the device key comprises a private device key.

8. The method of claim 1, wherein the private device key comprises a derived key.

9. The method of claim 8, wherein the private device key comprises a key derived from a private manufacturer key unique to the client device.

10. The method of claim 1, where the client device comprises a television.

11. The method of claim 1, wherein the client device comprises a set top box.

12. A non-transitory computer-readable medium storing instructions that, when executed by a processor of a client device, cause the client device to:
receive a broadcast content stream, the broadcast content stream comprising a plurality of encrypted content packets and at least one license information packet;
process the license information packet, wherein processing the license information packet comprises:
decrypting a session key included in the license information packet using a device key associated with the client device,
verifying a signature of at least a portion of the license information packet using the decrypted session key, and
determining that the license information packet is valid based on an expiration date included in the licensing information;
receive a request to render the broadcast content stream; and
in response to the request, descramble the content stream based on the processed license information packet, wherein descrambling the content stream comprises:
decrypting a content key included in the license information packet using the decrypted session key,
decrypting an encrypted control word included in the license information packet using the decrypted content key, and
decrypting the plurality of encrypted content packets using the decrypted control word.

13. The non-transitory computer-readable medium of claim 12, wherein the broadcast content stream comprises an MPEG2-encoded transport stream.

14. The non-transitory computer-readable medium of claim 12, wherein processing the license information packet further comprises:
determining that the license information packet has been compressed; and
based on the determination, decompressing the license information packet.

15. The non-transitory computer-readable medium of claim 12, wherein the license information packet comprises a binary formatted packet.

16. The non-transitory computer-readable medium of claim 12, wherein the license information packet comprises an object notation formatted packet.

17. The non-transitory computer-readable medium of claim 12, wherein the device key comprises a private device key.

18. The non-transitory computer-readable medium of claim 12, wherein the private device key comprises a derived key.

19. The non-transitory computer-readable medium of claim 18, wherein the private device key comprises a key derived from a private manufacturer key unique to the client device.

20. The non-transitory computer-readable medium of claim 12, where the client device comprises at least one of a television and a set top box.

* * * * *

UNITED STATES PATENT AND TRADEMARK OFFICE
CERTIFICATE OF CORRECTION

PATENT NO. : 10,560,748 B2  
APPLICATION NO. : 15/927404  
DATED : February 11, 2020  
INVENTOR(S) : Cugi et al.

Page 1 of 1

It is certified that error appears in the above-identified patent and that said Letters Patent is hereby corrected as shown below:

In the Claims

Claim 8, Column 37, Line 13, "private device key" should read as —device key—.

Claim 9, Column 37, Line 15, "private device key" should read as —device key—.

Claim 18, Column 38, Line 31, "private device key" should read as —device key—.

Claim 19, Column 38, Line 34, "private device key" should read as —device key—.

Signed and Sealed this  
Thirtieth Day of June, 2020

Andrei Iancu  
*Director of the United States Patent and Trademark Office*